(12) United States Patent
Norikane et al.

(10) Patent No.: US 8,137,087 B2
(45) Date of Patent: Mar. 20, 2012

(54) TONER PREPARATION METHOD AND APPARATUS, AND TONER PREPARED THEREBY

(75) Inventors: Yoshihiro Norikane, Yokohama (JP);
Shinji Ohtani, Shizuoka-ken (JP);
Yohichiroh Watanabe, Fuji (JP);
Kazumi Suzuki, Shizuoka-ken (JP)

(73) Assignee: Ricoh Company, Ltd., Tokyo (JP)

( * ) Notice: Subject to any disclaimer, the term of this patent is extended or adjusted under 35 U.S.C. 154(b) by 979 days.

(21) Appl. No.: 12/055,955

(22) Filed: Mar. 26, 2008

(65) Prior Publication Data

US 2008/0248416 A1 Oct. 9, 2008

(30) Foreign Application Priority Data

Apr. 5, 2007 (JP) ................................ 2007-099791
May 17, 2007 (JP) ................................ 2007-131139

(51) Int. Cl.
*B29B 9/00* (2006.01)
*G03G 5/00* (2006.01)
(52) U.S. Cl. .......................... 425/6; 430/137.1; 310/311
(58) Field of Classification Search .................. 430/105, 430/137.1, 137.14; 425/6; 118/313–315; 141/52, 59, 65, 67; 310/311
See application file for complete search history.

(56) References Cited

U.S. PATENT DOCUMENTS

| | | | | |
|---|---|---|---|---|
| 7,514,145 | B2 * | 4/2009 | Akioka et al. ................. | 428/402 |
| 2003/0224271 | A1 * | 12/2003 | Teshima ........................ | 430/105 |
| 2006/0115756 | A1 * | 6/2006 | Komatsu et al. .............. | 430/105 |
| 2006/0210909 | A1 | 9/2006 | Ohtani | |
| 2006/0240354 | A1 | 10/2006 | Ohtani | |
| 2008/0063971 | A1 * | 3/2008 | Watanabe et al. ........... | 430/110.4 |
| 2008/0292985 | A1 * | 11/2008 | Suzuki et al. ................. | 430/116 |
| 2009/0004593 | A1 * | 1/2009 | Kaiho et al. .................. | 430/113 |

FOREIGN PATENT DOCUMENTS

| | | |
|---|---|---|
| EP | 1344562 A2 | 9/2003 |
| EP | 1703332 A2 | 9/2006 |
| EP | 1992995 A2 | 11/2008 |
| FR | 2814460 | 3/2002 |
| JP | 57-65349 | 4/1982 |
| JP | 57-201248 | 12/1982 |
| JP | 57-207710 | 12/1982 |
| JP | 61-141955 | 6/1986 |
| JP | 62-46226 | 10/1987 |
| JP | 7-152202 | 6/1995 |
| JP | 3786034 | 3/2006 |
| JP | 3786035 | 3/2006 |
| JP | 2006-293320 | 10/2006 |
| JP | 2006-297325 | 11/2006 |

OTHER PUBLICATIONS

Oct. 22, 2010 European official action in connection with counterpart European patent application No. 08251116.
Nov. 4, 2008 search report in connection with a counterpart European patent application No. 08 25 1116.

* cited by examiner

*Primary Examiner* — Mark F Huff
*Assistant Examiner* — Stewart Fraser
(74) *Attorney, Agent, or Firm* — Cooper & Dunham LLP

(57) ABSTRACT

A method of preparing a toner, including periodically dripping and discharging a droplet of a toner constituent liquid including a resin and a colorant; and solidifying and granulating the droplet, wherein the dripper includes a thin film including plural nozzles; and an oscillator including an oscillation generator generating an oscillation; and an oscillation amplifier, including an oscillation surface facing the thin film in parallel therewith, amplifying the oscillation, and wherein the toner constituent liquid is fed between the thin film and the oscillation surface.

16 Claims, 12 Drawing Sheets

TONER PREPARATION METHOD AND APPARATUS, AND TONER PREPARED THEREBY

BACKGROUND

1. Technical Field

This disclosure relates to a toner preparation method and apparatus, and a toner prepared thereby; and more particularly to a spray granulation method and a spray granulation apparatus for preparing a toner, and a toner prepared thereby.

2. Discussion of the Related Art

Developers for use in electrophotography, electrostatic recording and electrostatic printing, in their developing processes, are transferred to image bearers such as photoreceptors electrostatic latent images are formed on, transferred therefrom to a transfer medium such as a transfer paper, and fixed thereon. As the developers for developing electrostatic latent images formed on image bearers, a two-component developer including a carrier and a toner, and a one-component developer without a carrier, such as a magnetic toner and a nonmagnetic toner, are known.

Conventionally, as a dry toner for use in electrophotography, electrostatic recording and electrostatic printing, a pulverized toner is widely used, which is formed by kneading a toner binder such as styrene resins and polyester resins with a colorant, etc. upon application of heat, cooling the kneaded mixture to be solidified and pulverizing the solidified mixture.

Recently, polymerized toners prepared by suspension polymerization methods, emulsion polymerization condensation methods, etc. are being used. Besides, Japanese published unexamined application No. 7-152202 discloses a polymer solution suspension method of using a volume contraction. This method includes dispersing or dissolving toner constituents in a volatile solvent such as an organic solvent having a low boiling point to prepare a dispersion or a solution, emulsifying the dispersion or solution in an aqueous medium to form a droplet, and removing the volatile solvent. The diversity of resins this method can use is wider than those of the suspension polymerization methods and emulsion polymerization condensation methods, and has an advantage of being capable of using a polyester resin effectively used for full-color images requiring transparency and smoothness.

However, in the polymerization methods, since a dispersant is basically used in an aqueous medium, the dispersant impairing the chargeability of a toner remains on the surface thereof, resulting in deterioration of environmental resistance. In addition, a large amount of water is needed to remove the dispersant, resulting in unsatisfactory methods of preparing a toner.

Japanese published unexamined application No. 57-201248 discloses a spray dry method having been known from long ago as a method of preparing a toner without using an aqueous medium. This atomizes and discharges a toner constituent solution or a toner constituent liquid with various atomizers, and dries to form particles. Therefore, this does not have problems o using an aqueous medium.

However, particles prepared by the conventional spray granulation methods are coarse and large, and have a wide particle diameter distribution, resulting in deterioration of toner properties themselves.

Japanese Patent No. 3786034 discloses a method and an apparatus forming a microscopic droplet with a piezoelectric pulse, and drying and solidifying the microscopic droplet to form a toner. Further, Japanese Patent No. 3786035 discloses a method of forming a microscopic droplet with a heat expansion in a nozzle, and drying and solidifying the microscopic droplet to form a toner.

However, each of Japanese Patents Nos. 3786034 and 3786035 discharges a droplet only from one nozzle with one piezoelectric body, and the number of the droplets dischargeable per unit of time is small, resulting in poor productivity.

The present inventors disclose in Japanese published unexamined application No. 2006-293320 that a nozzle is oscillated by expansion and contraction of a piezoelectric body as an oscillator to discharge a toner constituent fluid droplet at a constant frequency, and that the droplet is solidified to from a toner. Japanese published unexamined application No. 2006-297325 discloses that an oscillator oscillating a discharge member having a discharge hole as an oscillation member with at a predetermined frequency such that a droplet is discharged from the discharge hole, and that the droplet is dried and solidified to from a toner.

However, as disclosed in Japanese published unexamined application No. 2006-293320, the piezoelectric body facing an periphery of the nozzle oscillates by expansion and contraction only a region of the nozzle facing an opening of the piezoelectric body, and therefore the nozzle is unable to have a large amount of displacement. Namely, the nozzle is likely to be clogged when discharging a toner constituent liquid having a high viscosity such as 10 mPa·s and including a large amount of dispersed solid contents. Therefore, the nozzle is still insufficiently formed to stably and efficiently prepare a toner. Although Japanese published unexamined application No. 2006-297325 discloses that a piezoelectric body oscillates the discharge member, a specific constitution is not disclosed therein and is not beyond the specification in Japanese published unexamined application No. 2006-293320.

Because of these reasons, a need exists for a nozzle formed of a member displaceable at a large amount of displacement.

SUMMARY OF THE INVENTION

In an aspect of this disclosure, there is provided a method of efficiently preparing a toner having less variation of many properties required, such as fluidity and chargeability.

In another aspect of this disclosure, there is provided an apparatus for efficiently preparing a toner having less variation of many properties required, such as fluidity and chargeability.

In another aspect, there is provided a toner prepared by the aforementioned method.

In another aspect, there is provided a method of preparing a toner, comprising:

periodically dripping and discharging a droplet of a toner constituent liquid comprising a resin and a colorant with a dripper; and solidifying and granulating the droplet, wherein the dripper comprises:

a thin film comprising plural nozzles; and an oscillator, comprising:

an oscillation generator configured to generate an oscillation; and an oscillation amplifier comprising an oscillation surface facing the thin film in parallel therewith, configured to amplify the oscillation, and wherein the toner constituent liquid is fed between the thin film and the oscillation surface.

The aforementioned and other aspects, features and advantages will become apparent upon consideration of the following description taken in conjunction with the accompanying drawings.

DESCRIPTION OF THE PREFERRED EMBODIMENTS

Figure 1:
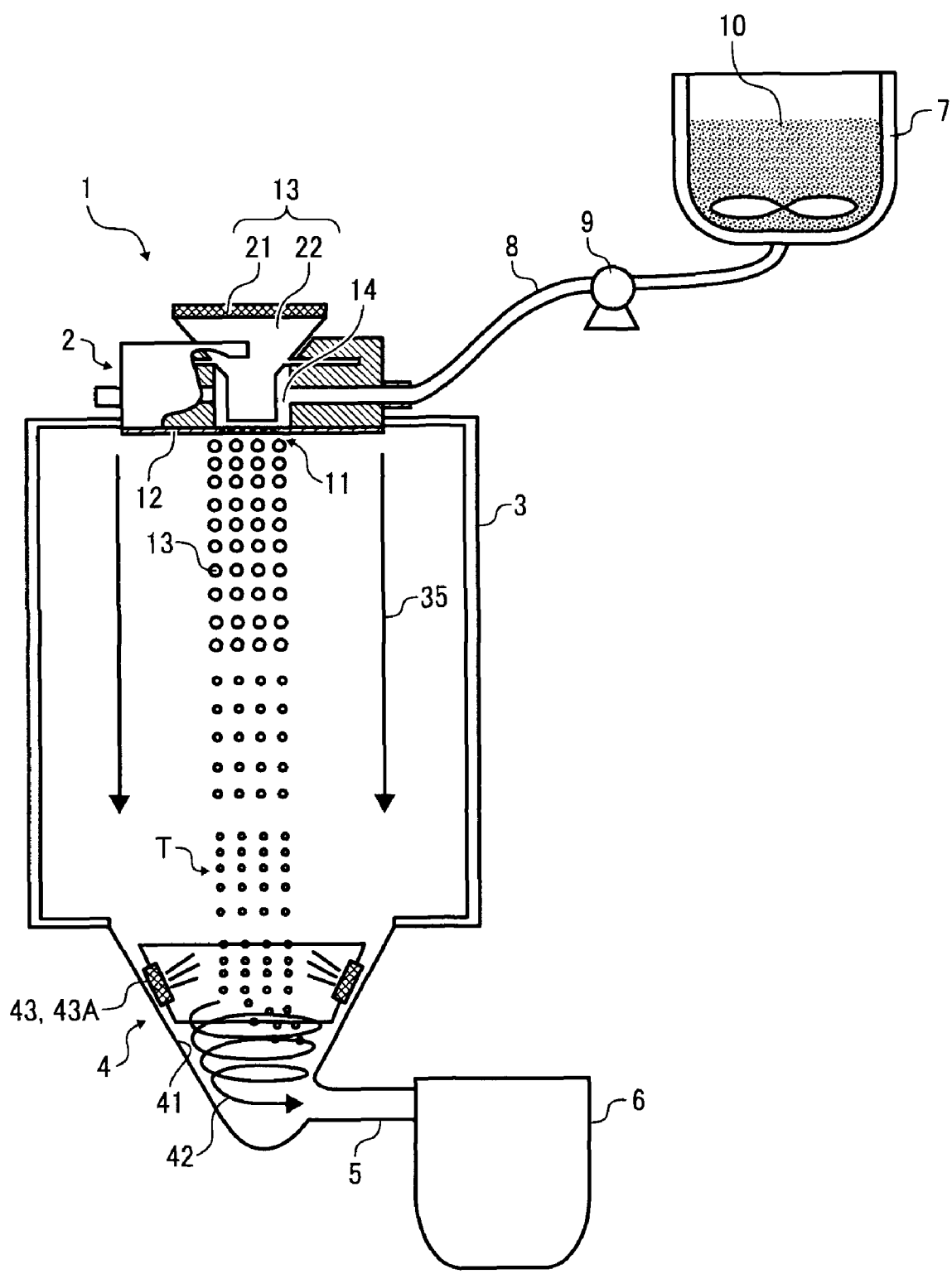
FIG. 1 is a schematic view illustrating an embodiment of the toner preparation apparatus of the present invention.

Generally, the present invention provides a method and an apparatus for efficiently preparing a toner having less variation of many properties required, such as fluidity and chargeability. More particularly, the present invention relates to a method of preparing a toner, comprising:
periodically dripping and discharging a toner constituent liquid comprising a resin and a colorant with a dripper; and
solidifying the droplet to granulate the droplet,
wherein the dripper comprises:
a thin film comprising plural nozzles; and
an oscillator, comprising:
an oscillation generator configured to generate an oscillation; and
an oscillation amplifier comprising an oscillation surface facing the thin film in parallel therewith, configured to amplify the oscillation, and
wherein the toner constituent liquid is fed between the thin film and the oscillation surface.

Hereinafter, the best embodiment of the present invention will be explained. First, an embodiment of the apparatus for preparing a toner using the method of preparing a toner of the present invention will be explained, referring to FIG. 1.

An apparatus 1 includes a droplet spray unit 2 as a dripper dripping a toner constituent liquid including at least a resin and a colorant to discharge a droplet thereof; a granulator 3 solidifying the droplet from the droplet spray unit 2 located above to form toner particles T; a toner collector 4 collecting the toner particles T; a toner storage storing the toner particles T transferred through a tube 5 from the toner collector 4; a material container 7 containing the toner constituent liquid 10; a liquid feeding pipe 8 feeding the toner constituent liquid 10 from the material container 7 to the droplet spray unit 2; and a pump 9 pumping the toner constituent liquid 10 through the liquid feeding pipe 8.

The toner constituent liquid 10 from the material container 7 is automatically fed to the droplet spray unit 2. The pump 9 subsidiarily assists feeding the liquid. The toner constituent liquid 10 is a toner constituent solution or a dispersion including a solvent, and at least a resin and a colorant dissolved or dispersed therein.

Figure 2:
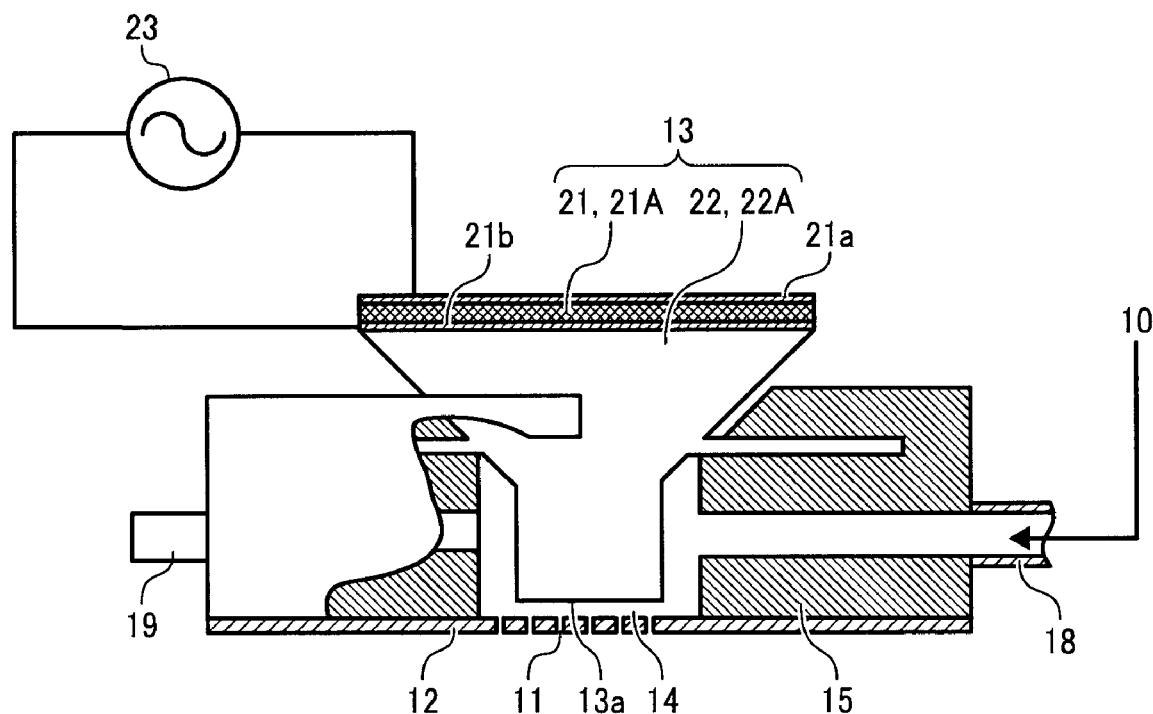
FIG. 2 is an enlarged view of an embodiment of a droplet spray unit of the toner preparation apparatus in FIG. 1.
Figure 3:
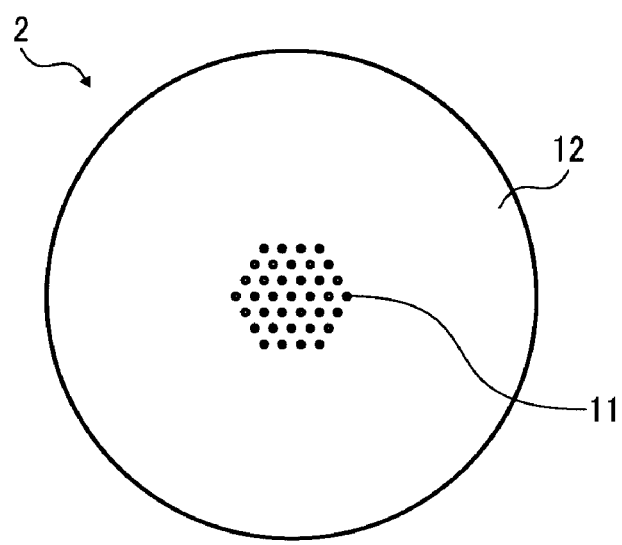
FIG. 3 is a bottom view of the droplet spray unit in FIG. 2.

Next, the droplet spray unit 2 will be explained, referring to FIGS. 2 and 3. FIG. 2 is an enlarged view of an embodiment of a droplet spray unit of the toner preparation apparatus in FIG. 1, and FIG. 3 is a bottom view of the droplet spray unit in FIG. 2.

The droplet spray unit 2 includes a thin film 12 having plural nozzles (discharge openings); an oscillator 13 oscillating the thin film 12; and a flow path member 15 forming a reservoir (liquid flow path) 14 retaining the toner constituent liquid 10 including at least a resin and a colorant between the thin film 12 and the oscillator 13.

The circumference of the thin film 12 is fixed on the flow path member 15 with a solder or a binder resin insoluble in the toner constituent liquid. The materials of the thin film 12 and the shape of the nozzle 11 are not particularly limited, and it is preferable that the thin film is formed of a metallic plate having a thickness of from 5 to 500 μm and that the nozzle has an opening diameter of from 3 to 35 μm in terms of spraying microscopic droplets of the toner constituent liquid 10 having a uniform diameter from the nozzle 11. The opening diameter of the nozzle 11 is a diameter for a perfect circle and a minor diameter for an ellipse. The number of the nozzles is preferably from 2 to 3,000.

The oscillator 13 includes an oscillation generator 21 and an oscillation amplifier 22 amplifying an oscillation generated by the oscillation generator 21. A drive circuit (derive signal generator) 23 applies a drive voltage (drive signal) having a required frequency between electrodes 21a and 21b of the oscillation generator 21 to excite an oscillation thereof. The oscillation is amplified by the oscillation amplifier 22 and an oscillation surface 13a periodically oscillates to oscillate the thin film 12 at a required frequency.

The oscillator 13 is not particularly limited, provided it can vertically oscillate the thin film 12 at a constant frequency. The oscillation generator 21 preferably includes a bimorph piezoelectric body 21A exciting a flexural oscillation for oscillating the thin film 12. The piezoelectric body 21A converts an electrical energy to a mechanical energy. Specifically, when a voltage is applied to the piezoelectric body 21A, a flexural oscillation is excited to oscillate the thin film 12.

Specific examples of the piezoelectric body 21A forming the oscillation generator 21 include piezoelectric ceramics such as lead zirconate titanate (LZT). The piezoelectric ceramics are typically layered because of having a small displacement. Besides, piezoelectric polymers such as polyvinylidenefluoride (PVDF) and single crystals such as quartz, $LiNbO_3$, $LiTaO_3$ and $KNbO_3$.

The oscillator 13 is located anywhere, provided it can vertically oscillate the thin film 12 having the nozzle 11. The oscillation surface 13a and the thin film 12 are parallely located each other.

A horn oscillator can be used as the oscillator 13 formed of the oscillation generator 21 and the oscillation amplifier 22. Since the horn oscillator amplifies an oscillation of the oscillation generator 21 such as a piezo element with a horn 22A as the oscillation amplifier 22, a mechanical load thereon is not so large that the horn oscillator has a long life.

Figure 4:
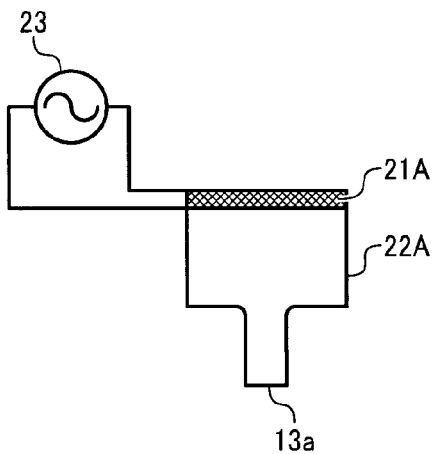
FIG. 4 is a schematic view illustrating a step-shaped horn oscillator forming an embodiment of the oscillation generator of the droplet spray unit in FIG. 2.
Figure 5:
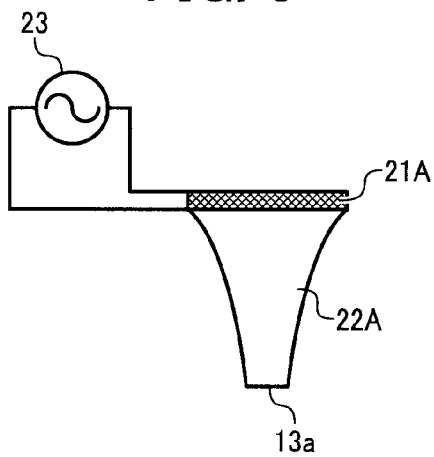
FIG. 5 is a schematic view illustrating an exponential horn oscillator forming another embodiment of the oscillation generator of the droplet spray unit in FIG. 2.
Figure 6:
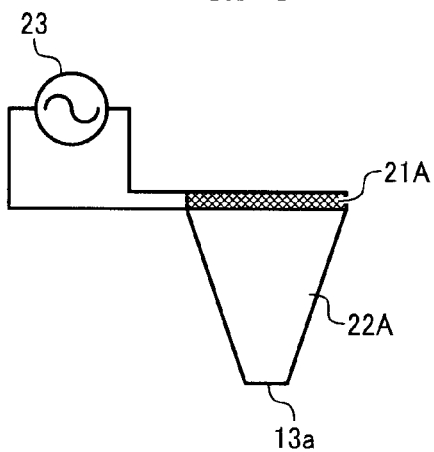
FIG. 6 is a schematic view illustrating a conical horn oscillator forming a further embodiment of the oscillation generator of the droplet spray unit in FIG. 2.

The horn oscillator may have any known shapes of horns such as a step type in FIG. 4, an exponential type in FIG. 5 and a conical type on FIG. 6. The piezoelectric bodies 21A are located on the surfaces having larger areas of the horns 22A. The piezoelectric bodies 21A induces an efficient oscillation of the horns 22A with vertical oscillation, and the horns 22A are designed to have the maximum oscillation surface 13a having a smaller area.

In addition, a particularly high-strength bolted Langevin type oscillator can also be used as the oscillator 13. A mechanically combined piezoelectric ceramics forms the bolted Langevin type oscillator, and which does not break when oscillating at a high amplitude.

A liquid feeding tube 18 feeding the toner constituent liquid to the reservoir (liquid flow path) 14 and an air bubble discharge tube (or a liquid circulation tube) 19 are connected with at least one part of the flow path member 15. A holder (not shown) installed on the flow path member 15 holds the droplet spray unit 2 on the ceiling of the granulator 3. The droplet spray unit 2 may be located on the drying side surface or the bottom of the granulator 3.

The oscillator 13 typically becomes larger as the frequency reduces, and may optionally be directly subjected to hole drilling to have a reservoir according to a required frequency. Further, the whole reservoir can efficiently be oscillated. In this case, the oscillation surface is defined as a surface laminated with the thin film having plural nozzles.

Different embodiments of the droplet spray unit 2 will be explained, referring to FIGS. 7 and 8.

Figure 7:
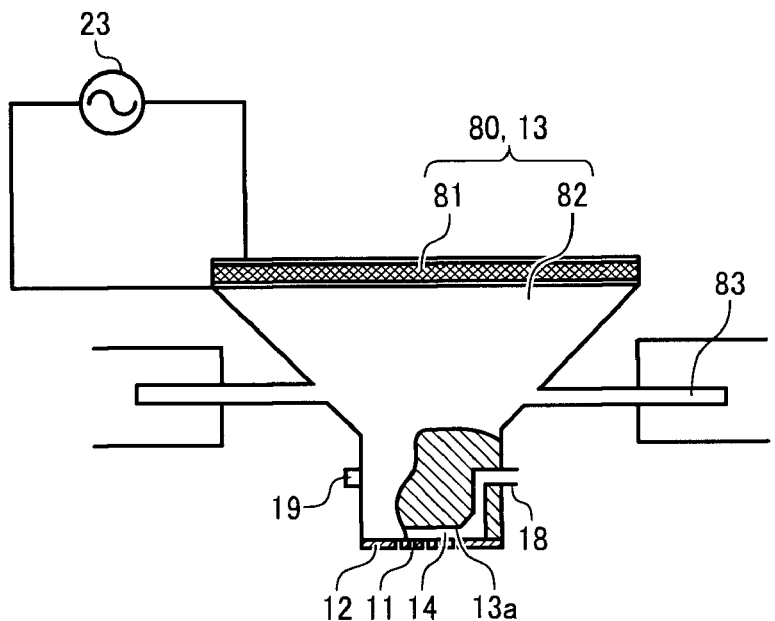
FIG. 7 is an enlarged view of another embodiment of the droplet spray unit of the toner preparation apparatus in FIG. 1.

In FIG. 7, a horn type oscillator 80 formed of a piezoelectric body 81 as an oscillation generator and a horn 82, in which a reservoir (flow path) 14 is partially formed, as an amplifier is used as the oscillator 13. The droplet spray unit 2 is preferably fixed on the drying side surface of the granulator 3 by a flange 83 integrally-formed with the horn 82 of the horn type oscillator 80. In terms of preventing oscillation loss, an elastic body (not shown) can be used to fix the droplet spray unit 2.

Figure 8:
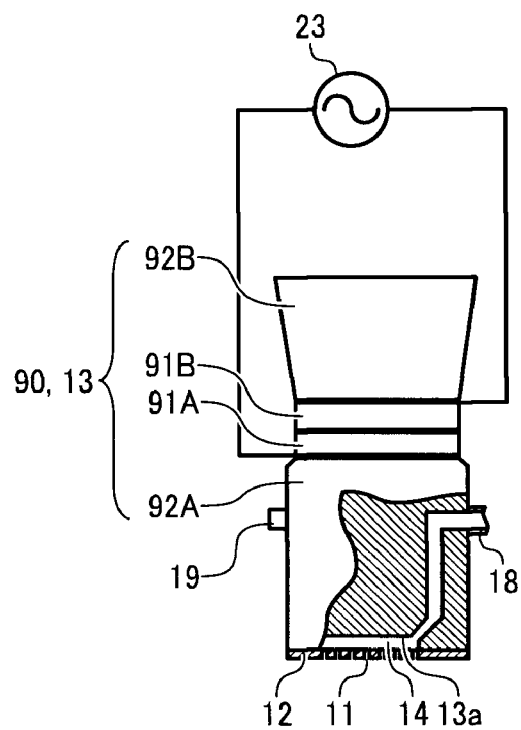
FIG. 8 is an enlarged view of a further embodiment of the droplet spray unit of the toner preparation apparatus in FIG. 1.

In FIG. 8, a bolted Langevin type oscillator 90 formed of piezoelectric bodies 91A and 91B as oscillation generators and horns 92A, in which a reservoir (flow path) 14 is formed, and 92B mechanically and firmly fixed with bolts, as amplifiers is used as the oscillator 13.

Plurality of the droplet spray units 2 are preferably located above in the granulator 3 (drying tower) in parallel in terms of improving productivity of a toner. The number thereof is preferably from 100 to 1,000 in terms of controllability. In this case, the toner constituent liquid 10 in the material container (common liquid container) 7 is fed through the feeding pipe 8 to the reservoir 14 of each of the droplet spray units 2.

The toner constituent liquid 10 from the material container 7 can automatically be fed to the droplet spray unit 2, and the pump 9 subsidiarily can assist feeding the liquid.

Figure 9:
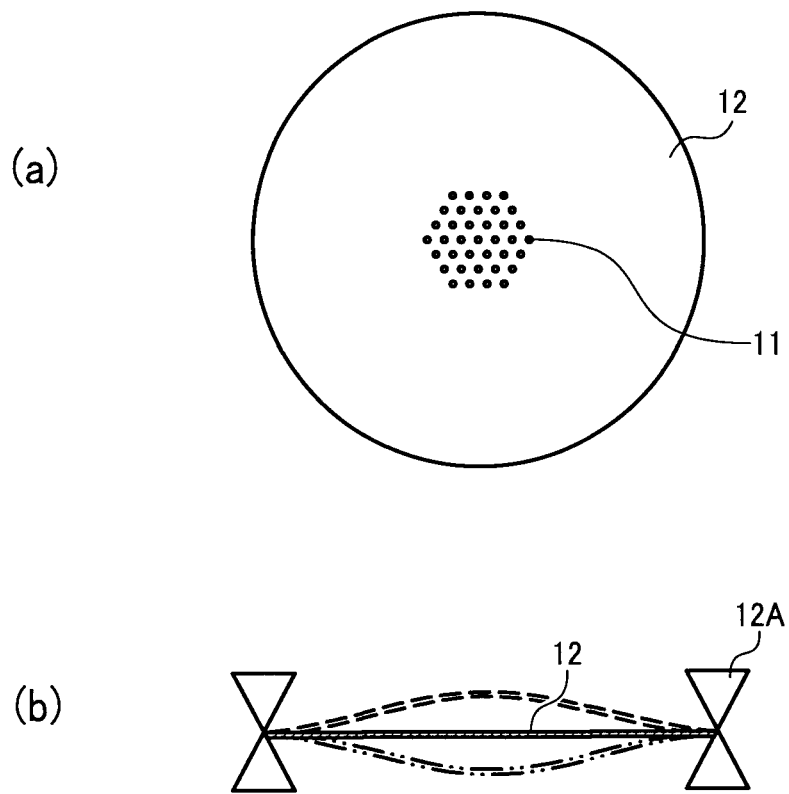
FIGS. 9A and 9B are schematic views illustrating the thin film for explaining the principle of dripping operation by the droplet spray unit.

A droplet forming mechanism by the droplet spray unit 2 will be explained, referring to FIG. 9.

As mentioned above, the droplet spray unit 2 transmits a oscillation generated by the oscillator 13 as a mechanical oscillator to the thin film 12 having plural nozzles 11 facing the reservoir 14 to periodically oscillate the thin film 12. The plural nozzles 11 are located in comparatively a large area having a diameter not less than 1 mm, and droplets stably formed and discharged therefrom.

An operation principle of the droplet spray unit 2 will be explained.

Figure 10:
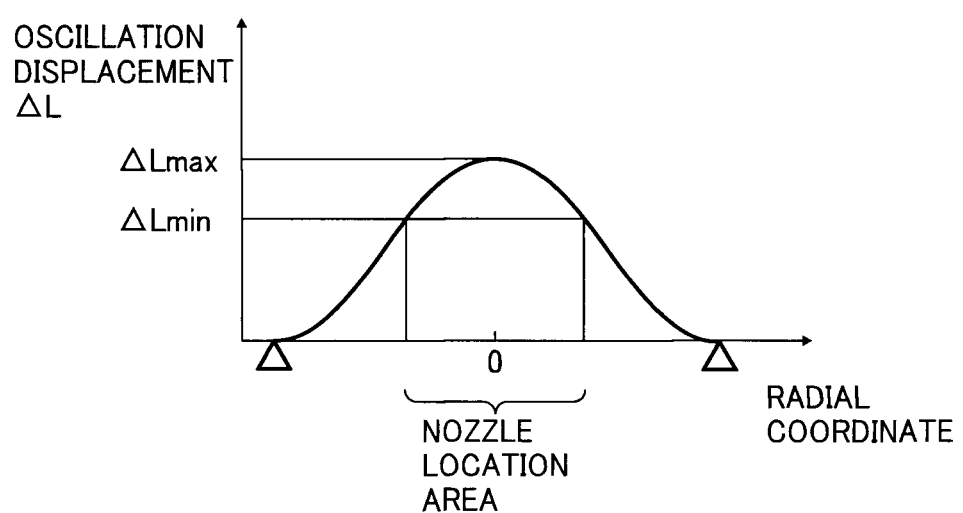
FIG. 10 is an explanatory view of a base oscillation mode of the droplet spray unit.
Figure 11:
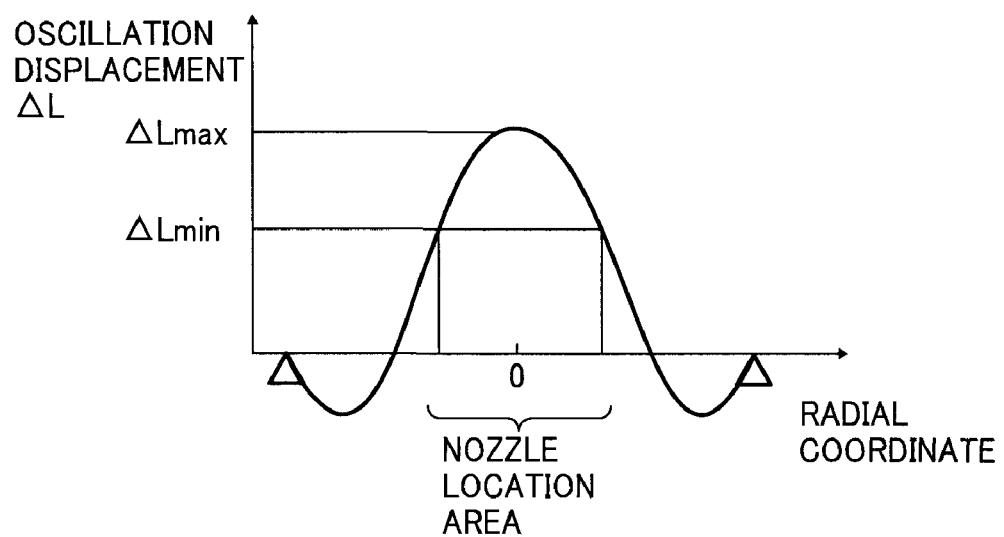
FIG. 11 is an explanatory view of a secondary oscillation mode of the droplet spray unit.
Figure 12:
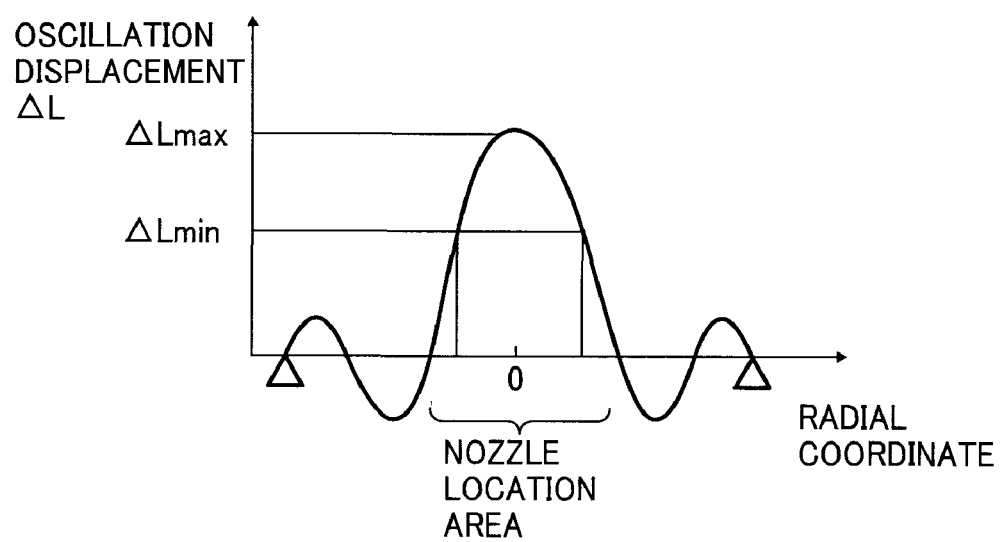
FIG. 12 is an explanatory view of a third oscillation mode of the droplet spray unit.
Figure 13:
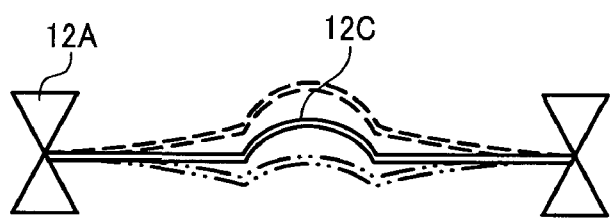
FIG. 13 is a schematic view illustrating the thin film having a convexity at the center.

When a simple circular thin film 12 having a fixed circumference 12A of as shown in FIGS. 9(a) and 9(b) is oscillated, a basic oscillation has a displacement ΔL becoming maximum (ΔLmax) at the center O of the thin film 12 as shown in FIG. 10 while the circumference is a joint and the thin film 12 periodically oscillates up and down. As shown in FIG. 11, the thin film 12 preferably oscillates having the circumference being a joint without a joint in the radial direction. As shown in FIGS. 11 and 12, higher oscillation modes are known. These modes concentrically have one or plural joints in a circular thin film 12 and substantially has a symmetric deformed configuration in the radial direction. In addition, as shown in FIG. 3, when the circular thin film 12 has a convex center 12C, a traveling direction of the droplet and the amplitude can be controlled.

When the circular thin film 12 oscillates, the (toner constituent) liquid close to the plural nozzles 11 formed on the circular thin film 12 has a pressure Pa proportional to an oscillation speed Vm of the thin film 12. A sound pressure is known to generate as a radiation impedance Zr of a medium (toner constituent liquid), and the pressure is determined by the following formula:

$$Pa = Zr \cdot Vm \qquad (1).$$

The oscillation speed Vm of the thin film 12 is a function of time because of periodically varying with time, and can form various periodical variations such as a sine waveform and a rectangle waveform. In addition, as mentioned above, every part of the thin film 12 has a different oscillation displacement and the oscillation speed Vm is also a function of a position coordinate on the thin film 12. An oscillation form of the thin film 12 is preferably a symmetric deformed configuration in the radial direction as mentioned above, and substantially a function of a radius coordinate.

As mentioned above, a pressure proportional to an oscillation displacement speed having a distribution of the thin film 12 is generated and the toner constituent liquid 10 is discharged to a gas phase in accordance with a periodical change of the pressure. Since the toner constituent liquid 10 periodically discharged to the gas phase becomes spherical due to a difference of surface tensions between the liquid phase and the gas phase, the toner constituent liquid 10 is periodically dripped and discharged from the plural nozzles 11.

The thin film 12 preferably has an oscillation frequency of from 20 kHz to 2.0 MHz, and more preferably from 50 to 500 kHz. The oscillation frequency not less than 20 kHz accelerates dispersion of a pigment and a wax in the toner constituent liquid 10 to prevent the nozzle 11 from being clogged.

The dispersion of a pigment and a wax is more preferably accelerated when the toner constituent liquid 10 has a pressure not less than 10 kPa.

The droplet has a larger diameter as the oscillation displacement in an area where the plural nozzles 11 are formed becomes larger. When the oscillation displacement is small, a small droplet is formed or the toner constituent liquid 10 is not dripped. In order to reduce variation of the droplet sizes in an area where the plural nozzles 11 are formed, the plural nozzles 11 need to be located such that the thin film 12 has the most suitable oscillation displacement.

According to an experiment, when the plural nozzles 11 are located such that the oscillation of the thin film 12 the oscillator 13 generates in FIG. 10 or 11 has a ratio R (ΔLmax/ΔLmin) of a maximum (ΔLmax) to a minimum (ΔLmin) of the oscillation direction displacement not greater than 2.0 in an area the plural nozzles are formed, i.e., when the plural nozzles 11 are located in an area where R is not greater than 2.0, the droplet size variation can be in a range of toner particle sizes required to produce high-quality images. Namely, the droplet diameter distribution is narrow and the resultant toner particle size distribution is sharp.

Meanwhile, when the toner constituent liquid has a viscosity not greater than 20 mPa·s and surface tension of from 20 to 75 mN/m, a satellite generates. Therefore, the toner constituent liquid 10 preferably has a pressure of from 10 kPa to 500 kPa, and more preferably from 10 kPa to 100 kPa to prevent the satellite from generating.

Next, the granulator 3 solidifying a droplet 31 of the toner constituent liquid 10 to form a toner particle T will be explained.

As mentioned above, the toner constituent liquid 10 is a toner constituent solution or a dispersion including a solvent, and at least a resin and a colorant dissolved or dispersed therein. Therefore, the droplet 31 is dried and solidified to form the toner particle T. Namely, the granulator 3 is a solvent remover drying and removing the solvent of the droplet 31 to form the toner particle T (hereinafter the granulator 3 is referred to as a "a solvent remover" or a "drier").

Specifically, the granulator 3 transports the droplet 31 discharged from the nozzle 11 of the droplet spray unit 2 with a dry gas 35 streaming in the same direction as the dropping direction of the droplet 31 to remove the solvent therefrom and form the toner particle T. The dry gas 35 has a dew point not higher than −10° C. at atmospheric pressure. The dry gas 35 may be any gas capable of dying the droplet 31, such as air and nitrogen.

Next, the toner collector 4 collecting the toner particle T formed in the granulator 3 will be explained.

The toner collector 4 is formed following to the granulator 3 on the downstream side in the dropping direction of the particle, and has a taper surface gradually tapering from entrance (toward the droplet spray unit 2) to exit. For example, a suction pump (not shown) generates a vortex air stream 42 going down in the toner collector 4, and which collects the toner particle T. The vortex air stream 42 generates a centrifugal force to steadily collect the toner particle T and transports that to a toner reservoir 6.

Figure 14:
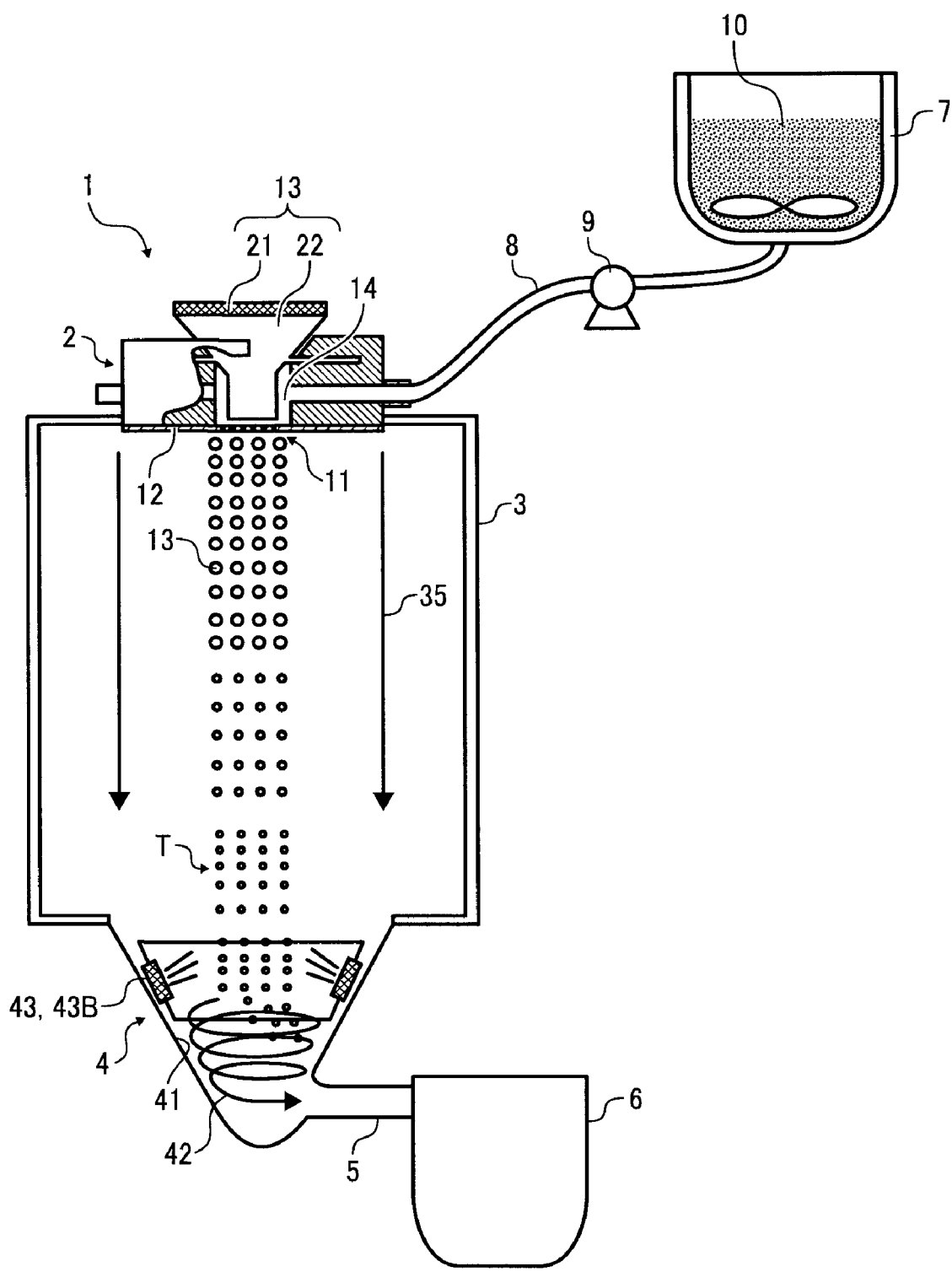
FIG. 14 is a schematic view illustrating another embodiment of the toner preparation apparatus of the present invention.

A discharger 43 temporarily neutralizing (discharging) a charge of the toner particle T formed in the granulator 3 is located at the entrance of the toner collector 4. The discharger 43 uses a soft X-ray irradiator 43A irradiating the toner particle T with a soft X-ray, and can use a plasma irradiator 43B irradiating the toner particle T with plasma as shown in FIG. 14.

The toner particle T collected by the toner collector 4 is transported by the vortex air stream 42 to the toner reservoir 6 through a tube 5 and retained therein. When the toner collector 4, the tube 5 and the toner reservoir 6 are formed of electroconductive materials, these are preferably earthed. Further, the apparatus itself is preferably an explosion-proof apparatus. The toner particle T may be transported to the toner reservoir 6 upon application of pressure or absorbed thereby.

Next, an outline of the method of preparing a toner of the present invention, using the apparatus 1 will be explained.

As mentioned above, when a drive signal having a required drive frequency applied to the oscillation generator 21 of the oscillator 13 while the toner constituent liquid 10 is stored in the reservoir 14 of the droplet spray unit 2, the oscillation generator 21 generates a flexural oscillation which is amplified by the oscillation amplifier 22 to oscillate the oscillation surface 13a.

The oscillation of the oscillation surface 13a of the oscillator 13 is transmitted to the thin film 12 through the toner constituent liquid 10 in the reservoir 14 to periodically oscillate the thin film 12. The oscillation thereof periodically drips the toner constituent liquid 10 from the plural nozzles 11 to be discharged as the droplet 31 (in FIG. 1) in the granulator 3 as the solvent remover.

The droplet 31 discharged in the granulator 3 is transported by the dry gas 35 streaming in the same direction as the dropping direction of the droplet 31 in the granulator 3 such that a solvent is removed therefrom to form the toner particle T. The toner particle T formed in the granulator 3 is collected by the air steam 42 in the toner collector 4 on the downstream side and is stored in the toner reservoir 6 through the tube 5.

Since the dripper of the droplet spray unit 2 has plural nozzles 11, many droplets 31 of the toner constituent liquid are discharged at the same time and the production efficiency of a toner noticeably improves. In addition, since the oscillator 13 oscillating the thin film 12 includes the oscillation generator 21 and the oscillation amplifier 22, the thin film 12 has a sufficient oscillation displacement. The plural nozzles 11 are located in an area having the large displacement to stably discharge many droplets 31 at the same time without clogging the nozzles 11, i.e., stably and efficiently prepare a toner. Further, the resultant toner particles have diameters which are more uniform than ever before.

In this embodiment, the toner constituent liquid 10 which is a toner constituent solution or a dispersion including a solvent, and at least a resin and a colorant dissolved or dispersed therein is dripped to form a droplet. A solvent included in the droplet is evaporated by a dry gas at the solvent remover and the droplet is contracted and solidified when dried to form a toner particle. However, the present invention is not limited to this embodiment.

For example, the toner constituent may be melted and liquidated in the heated reservoir to prepare a toner constituent liquid, which is cooled and solidified after discharged as a droplet to form a toner particle. In addition, the toner constituent liquid may include a thermosetting material, which is solidified upon application of heat after discharged as a droplet to form a toner particle.

Figure 15:
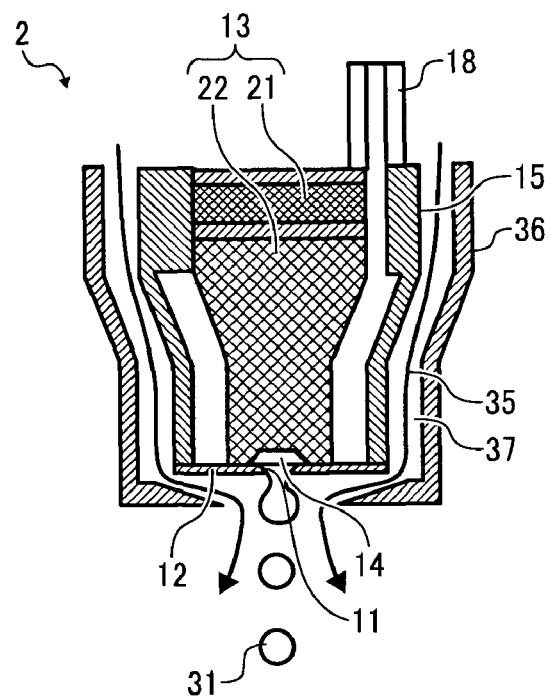
FIG. 15 is an enlarged view of another embodiment of the droplet spray unit of the toner preparation apparatus in FIG. 1.

Another embodiment of the droplet spray unit will be explained, referring to FIG. 15. FIG. 15 is an enlarged view of another embodiment of the droplet spray unit.

Similarly to the above-mentioned embodiment, a droplet spray unit uses a horn oscillator as an oscillation generator 13 and includes a flow path member 15 around the oscillation generator 13 and a reservoir 14 at a position facing a thin film 12 in a horn 22 of the oscillation generator 13. Further, an air flowpath forming member 36 forming an air flowpath 37 flowing an air stream 35 is located around the flow path member 15 at a required gap between the air flow path forming member 36 and the flow path member 15. In FIG. 15, the thin film 12 has only one nozzle 11 to simplify the drawing, but has plural nozzles as mentioned above.

Figure 16:
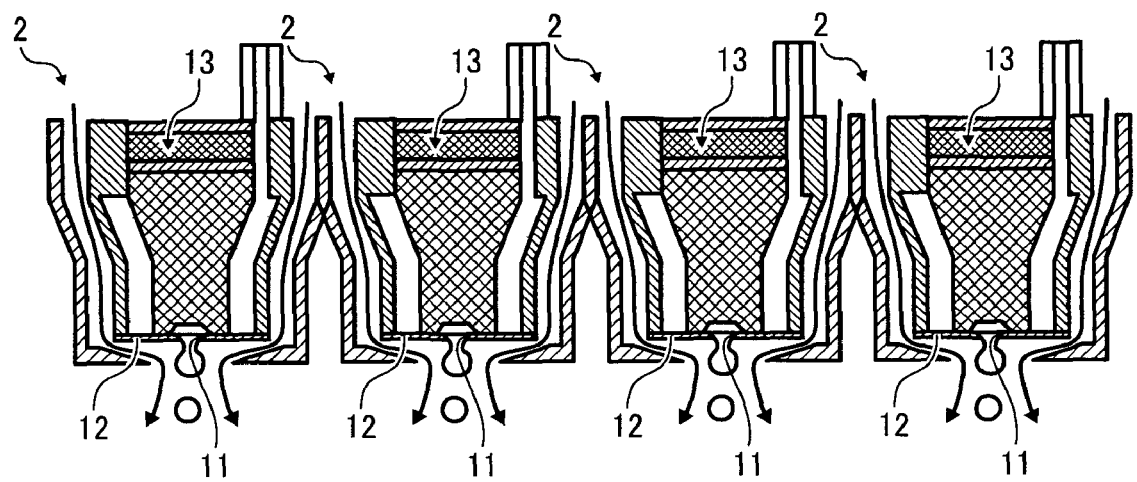
FIG. 16 is schematic view illustrating an arrangement of a plurality of the droplet spray unit in FIG. 15.

Further, as FIG. 16 shows, in order to improve productivity, plural, e.g., 100 to 1,000 pieces of the droplet spray units 2 are preferably located in line at a drying tower reservoir forming a granulator.

Figure 17:
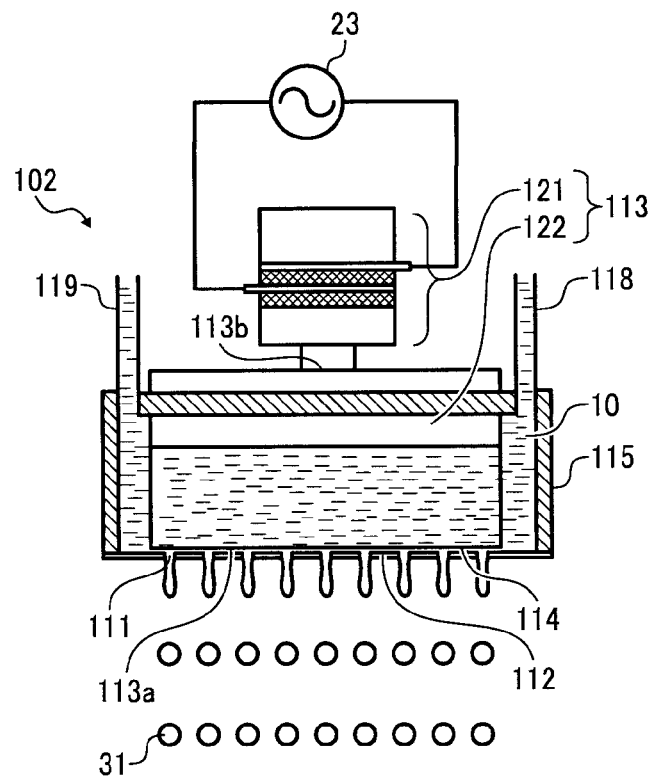
FIG. 17 is a schematic view illustrating a further embodiment of the droplet spray unit of the present invention.
Figure 18:
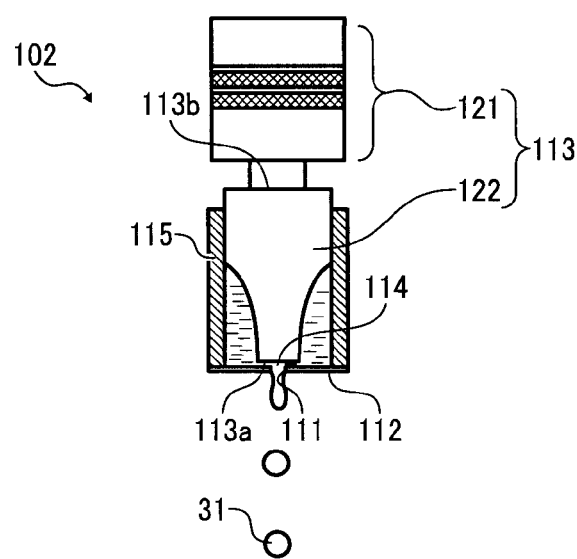
FIG. 18 is a left lateral view of the droplet spray unit in FIG. 17.
Figure 19:
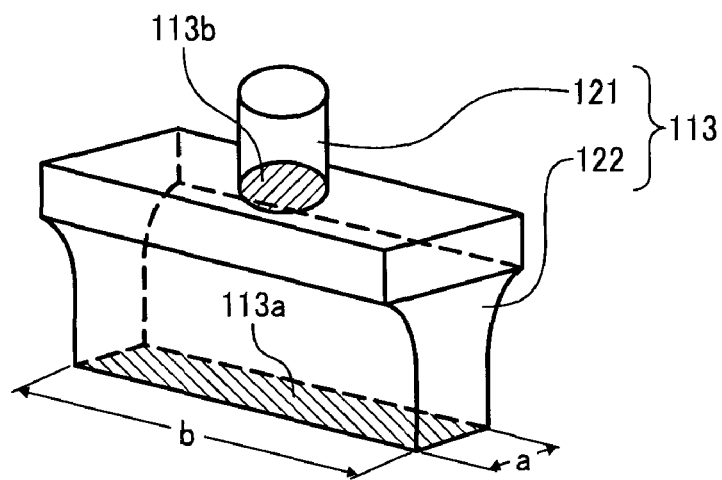
FIG. 19 is a perspective view illustrating an oscillator in the droplet spray unit in FIG. 17.

FIG. 17 is a schematic view illustrating a further embodiment of the droplet spray unit of the present invention, FIG. 18 is a left lateral view of the droplet spray unit therein, and FIG. 19 is a perspective view illustrating an oscillator in the droplet spray unit therein.

A droplet spray unit 102 includes a thin film 112 having plural nozzles (discharge openings); an oscillator 113 oscillating the thin film 112; and a flow path member 115 forming a reservoir (liquid flow path) 114 retaining the toner constituent liquid 10 including at least a resin and a colorant between the thin film 112 and the oscillator 113. The toner constituent liquid 10 is fed into the reservoir 114 through a liquid feeding tube 118, and the droplet spray unit 102 includes a liquid circulation tube 119.

Figure 20:
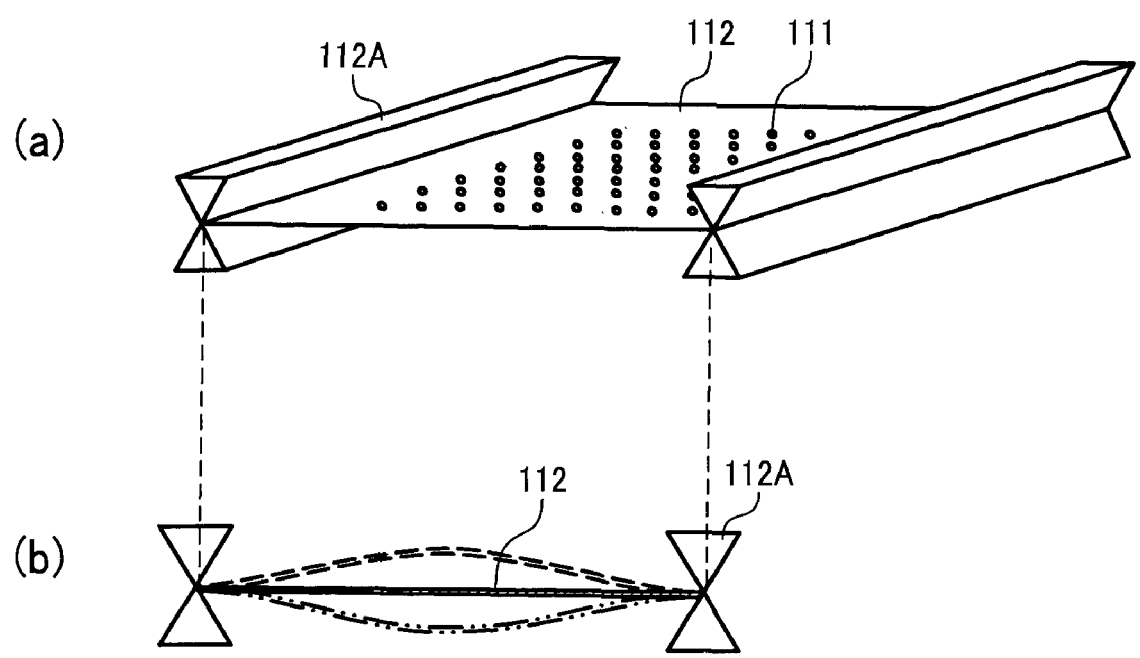
FIGS. 20(a) and 20(b) are schematic views illustrating a thin film in the droplet spray unit in FIG. 17.

As shown in FIG. 19, the oscillator 113 has an oscillation surface 113a having an area larger than that of a bonded surface 113b between an oscillation generator 121 and an oscillation amplifier 122. The oscillation surface 113a has the shape of a rectangle. The larger a ratio of a long side b to a short side a thereof, the larger the oscillation area. Therefore, the ratio is preferably larger than 2.0 in terms of productivity. As shown in FIG. 20, the thin film 112 has the shape of a rectangle as well in accordance with the rectangle-shaped oscillation surface 113a of the oscillator 113. Other constitutions such as materials and shapes are similar to the above-mentioned embodiment, and the explanations thereof are omitted.

Figure 21:
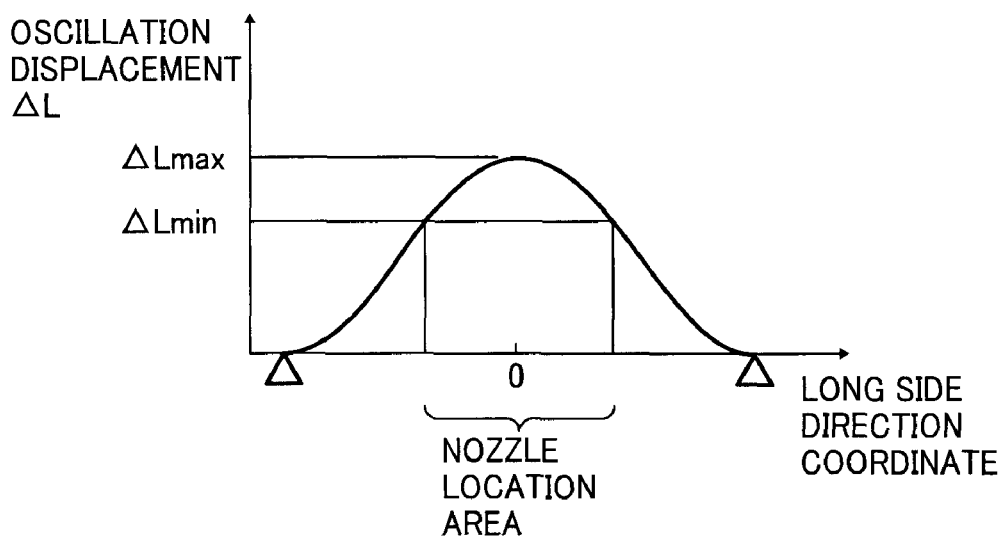
FIG. 21 is an explanatory view of a base oscillation mode of the droplet spray unit in FIG. 17.
Figure 22:
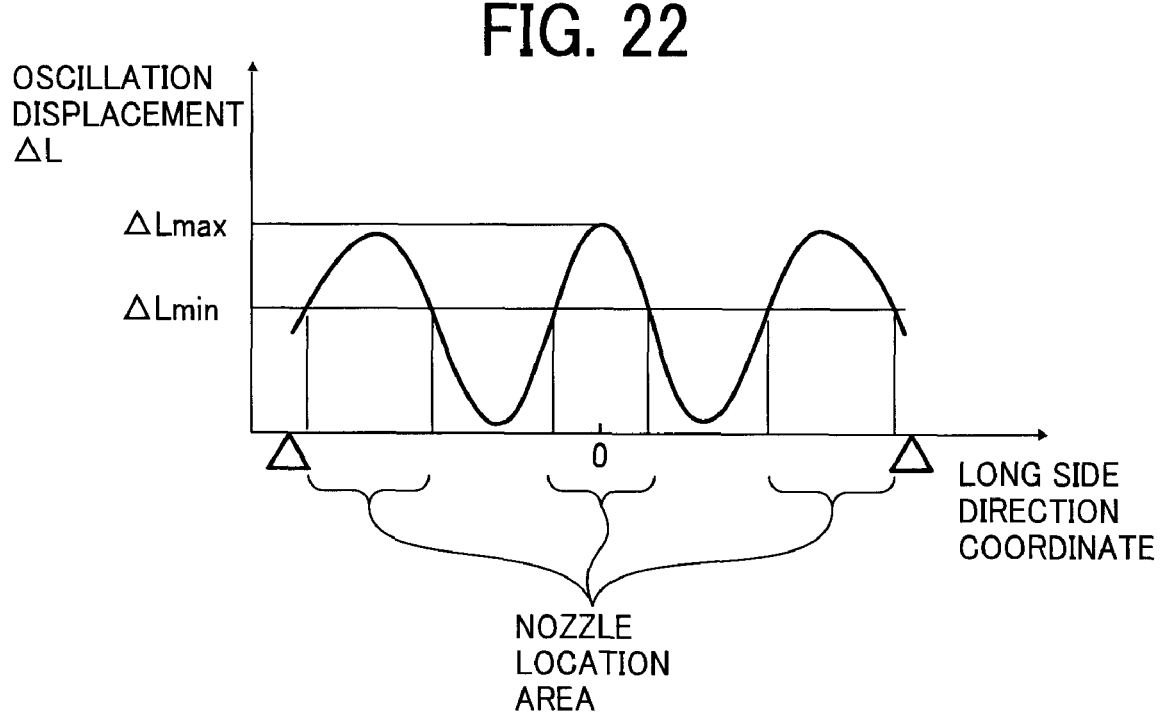
FIG. 22 is an explanatory view of a higher oscillation mode of the droplet spray unit in FIG. 17.

In this droplet spray unit 102, when the thin film 112 having a fixed circumference as shown in FIGS. 20($a$) and 20($b$), a basic oscillation has a displacement $\Delta L$ becoming maximum ($\Delta Lmax$) at the center O of the thin film 112 as shown in FIG. 21 while the circumference is a joint and the thin film 112 periodically oscillates up and down. As shown in FIG. 22, higher oscillation modes are known. In FIG. 22, the oscillation of the thin film 12 has a ratio R ($\Delta Lmax/\Delta Lmin$) of a maximum ($\Delta Lmax$) to a minimum ($\Delta Lmin$) of the oscillation direction displacement not greater than 2.0, i.e., nozzles 111 are located in three areas where R is not greater than 2.0.

Since the oscillation amplifier has an oscillation surface larger than a surface bonded to the oscillation generator, even a small oscillation can oscillate the thin film with a large displacement amount and efficiently granulate a monodispersed toner. Each of the oscillation surface and bonded surface preferably has the shape of a rectangle, and a ratio of a long side to a short side thereof not less than 2.0.

Figure 23:
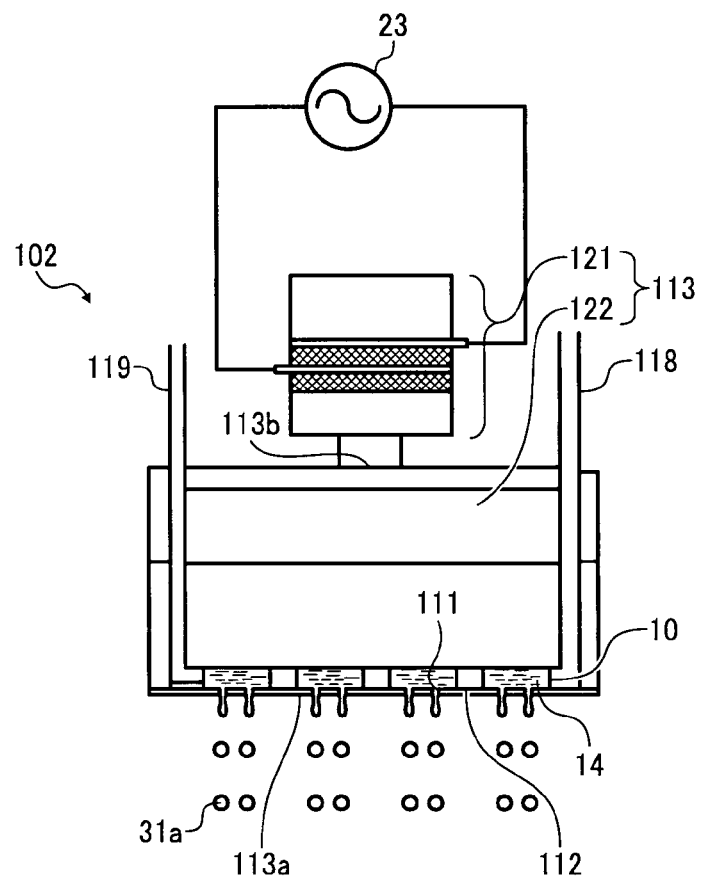
FIG. 23 is a schematic view illustrating another embodiment of the droplet spray unit of the present invention.
Figure 24:
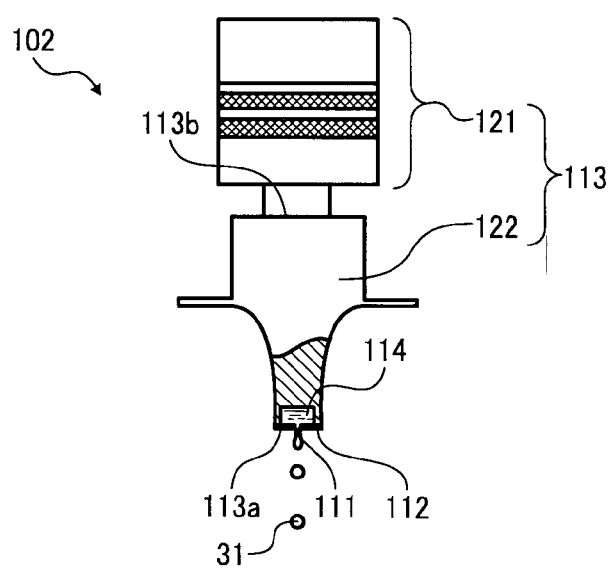
FIG. 24 is a left lateral view of the droplet spray unit in FIG. 23.

FIG. 23 is a schematic view illustrating another embodiment of the droplet spray unit of the present invention, and FIG. 24 is a left lateral view of the droplet spray unit in FIG. 23.

As mentioned above, the oscillator (a combination of the oscillation generator and the oscillation amplifier) typically becomes larger as the frequency reduces, and may optionally be directly subjected to hole drilling to have a reservoir according to a required frequency. Further, the whole reservoir can efficiently be oscillated. In this case, the oscillation surface is defined as a surface laminated with the thin film having plural nozzles.

In this embodiment, in addition to the embodiment in FIG. 17, the reservoir 114 is located in the oscillation amplifier 122. The oscillation amplifier 122 is preferably fixed on the wall of a granulator with a fixer, and which may be an elastic body in terms of preventing oscillation loss. The reservoir 114 may be located parallely in plural.

Next, the toner of the present invention will be explained. The toner is prepared by the above-mentioned method using the above-mentioned apparatus, which has a sharp particle diameter distribution.

Specifically, the toner preferably has a ratio of a weight-average particle diameter to a number-average particle diameter thereof of from 1.00 to 1.05. In addition, the toner preferably has the weight-average particle diameter of from 1 to 20 μm.

The toner of the present invention can easily be re-dispersed, i.e., floated due to electrostatic repulsion. Therefore, the toner can easily be transported to a developing area without conventional transport means. Namely, the toner can be transported even by an imperceptible air stream and a simple air pump can transport the toner to a developing area to be developed. An electrostatic latent image can be developed by so-called a power cloud development in quite good conditions without image forming disorder. In addition, the toner of the present invention can be used for conventional developing methods without problems. Carriers and members such as a developing sleeve are simply used as toner transporters, and do not need to have friction chargeability. Therefore, many other materials can be used therefor and durability thereof can largely be improved. In addition, more inexpensive materials can be used to reduce cost.

Next, the toner materials (toner constituent liquid) for use in the present invention will be explained.

Conventional toner materials for electrophotography can be used. Namely, atoner binder such as a styrene-acrylic resin, a polyester resin, a polyol resin and an epoxy resin is dissolved in an organic solvent to prepare a solution, and a colorant and a release agent is dispersed or dissolved therein to prepare a toner constituent liquid. Then, the toner constituent liquid is finely dripped, dried and solidified to prepare a toner particle of the present invention. Alternatively, the above-mentioned materials are melted and kneaded upon application of heat to prepare a kneaded mixture, and the kneaded mixture is dissolved or dispersed in a solvent to prepare a toner constituent liquid. Then, the toner constituent liquid is also finely dripped, dried and solidified to prepare a toner particle of the present invention.

The toner materials includes at least a resin and a colorant, and optionally other components such as a carrier and a wax.

The resin includes at least a binder resin.

Specific examples of the binder resin include, but are not limited to, conventionally-used resins such as a vinyl polymers including styrene monomers, acrylic monomers or methacrylic monomers, or copolymers including two or more of the monomers; polyester polymers; polyol resins; phenol resins; silicone resins; polyurethane resins; polyamide resins; furan resins; epoxy resins; xylene resins; terpene resins; coumarone-indene resins; polycarbonate resins; petroleum resins; etc.

Specific examples of the styrene monomers include styrenes or their derivatives such as styrene, o-methylstyrene, m-methylstyrene, p-methylstyrene, p-phenylstyrene, p-ethylstyrene, 2,4-dimethylstyrene, p-n-butylstyrene, p-tert-butylstyrene, p-n-hexylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dochlorostyrne, m-nitrostyrene, o-nitrostyrene and p-nitrostyrene.

Specific examples of the acrylic monomers include an acrylic acid or their esters such as methylacrylate, ethylacrylate, n-butylacrylate, isobutylacrylate, n-octylacrylate, n-dodecylacrylate, 2-ethylhexylacrylate, stearylacrylate, 2-chloroethylacrylate and phenylacrylate.

Specific examples of the methacrylic monomers include a methacrylic acid or their esters such as a methacrylic acid, methylmethacrylate, ethylmethacrylate, propylmethacrylate, n-butylmethacrylate, isobutylmethacrylate, n-octylmethacrylate, n-dodecylmethacrylate, 2-ethylhexylmethacrylate, stearylmethacrylate, phenylmethacrylate, dimethylaminoethylmethacrylate and diethylaminoethylmethacrylate.

Specific examples of other monomers forming the vinyl polymers or copolymers include the following materials (1) to (18):

(1) monoolefins such as ethylene, propylene, butylene and isobutylene; (2) polyenes such as butadiene and isoprene; (3) halogenated vinyls such as vinylchloride, vinylidenechloride, vinylbromide and vinylfluoride; (4) vinyl esters such as vinylacetate, vinylpropionate and vinylbenzoate; (5) vinylethers such as vinylmethylether, vinylethylether and vinylisobutylether; (6) vinylketones such as vinylmethylketone, vinylhexylketone and methyl isopropenylketone; (7) N-vinyl compounds such as N-vinylpyrrole, N-vinylcarbazole, N-vinylindole and N-vinylpyrrolidone; (8) vinylnaphthalenes; (9) acrylic acid or methacrylic acid derivatives such as acrylonitrile, methacrylonitrile and acrylamide; (10) unsaturated diacids such as a maleic acid, a citraconic acid, an itaconic acid, an alkenylsuccinic acid, a fumaric acid and a mesaconic acid; (11) unsaturated diacid anhydrides such as a maleic acid anhydride, a citraconic acid anhydride, an itaconic acid anhydride and an alkenylsuccinic acid anhydride; (12) monoesters of unsaturated diacids such as monomethylester maleate, monoethylester maleate, monobutylester maleate, monomethylester citraconate, monoethylester citraconate, monobutylester citraconate, monomethylester itaconate, monomethylester alkenylsuccinate, monomethylester fumarate and monomethylester mesaconate; (13) esters of unsaturated diacids such as a dimethyl maleic acid and a dimethyl fumaric acid; (14) α,β-unsaturated acids such as a crotonic acid and a cinnamic acid; (15) α,β-unsaturated acid anhydrides such as crotonic acid anhydride and a cinnamic acid anhydride; (16) monomers having a carboxyl group, such as anhydrides of the α,β-unsaturated acids and lower fatty acids, an alkenylmalonic acid, alkenylglutaric acid alkenyladipic acid, their anhydrides and monoesters; (17) hydroxyalkylester acrylates or methacrylates such as 2-hydroxyethylacrylate, 2-hydroxyethylmethacrylate and 2-hydroxypropylmethacrylate; and (18) monomers having a hydroxy group such as 4-(1-hydroxy-1-methylbutyl)styrene and 4-(1-hydroxy-1-methylhexyl)styrene.

The vinyl polymer or copolymer of the binder resin may have a crosslinked structure formed by a crosslinker having 2 or more vinyl groups. Specific examples of the crosslinker include aromatic divinyl compounds such as divinylbenzene and divinylnaphthalene; diacrylate compounds bonded with an alkyl chain, such as ethyleneglycoldiacrylate, 1,3-butyleneglycoldiacrylate, 1,4-butanedioldiacrylate, 1,5-pentanedioldiacrylate, 1,6-hexanedildiacrylate, neopentylglycoldiacrylate or their dimethacrylates; and diacrylate compounds bonded with an alkyl chain including an ester bond, such as diethyleneglycoldiacrylate, triethyleneglycoldiacrylate, tetraethyleneglycoldiacrylate, polyethyleneglycoldiacrylate#400, polyethyleneglycoldiacrylate#600, dipropyleneglycoldiacrylate or their dimethacrylates.

Diacrylate or dimethacrylate compounds bonded with a chain including an aromatic group and an ether bond can also be used. Polyester diacrylates include a product named MANDA from NIPPON KAYAKU CO., LTD.

Specific examples of a multifunctional crosslinker include pentaerythritoltriacrylate, trimethylolethanetriacrylate, trimethylolpropanetriacrylate, tetramethylolmethanetetraacrylate, oligoesteracrylate and their methacrylates, triallylcyanurate and triallyltrimellitate.

The toner preferably includes the crosslinker in an amount of 0.001 to 10 parts by weight, more preferably from 0.03 to 5 parts by weight based on total weight of the monomer. Among these crosslinking monomers, the aromatic divinyl compounds, particularly the divinylbenzene and the diacrylate compounds bonded with a bonding chain including an aromatic group and an ether bond are preferably used in terms of the fixability and offset resistance of the resultant toner. Further, styrene copolymers and styrene-acrylic copolymers are more preferably used.

Specific examples of a polymerization initiator used for preparing the vinyl polymer or copolymer include azo polymerization initiators such as 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobisisobutylate, 1,1'-azobis(cyclohexanecarbonitrile), 2-(carbamoylazo)-isobutyronitrile, 2,2'-azobis(2,4,4-trimethylpentane), 2-phenylazo-2',4'-fimethyl-4'-methoxyvaleronitrile and 2,2'-azobis (2-methylpropane); ketone peroxides such as methyl ethyl ketone peroxide, acetylacetone peroxide and cyclohexanone peroxide; 2,2-bis (tert-butylperoxy)butane; tert-butylhydroperoxide; cumenehydroperoxide; 1,1,3,3-tetramethylbutylhydroperoxide; di-tert-butylperoxide; tert-butylcumylperoxide; di-cumylperoxide; α-(tert-butylperoxy)isopropylbenzene; isobutylperoxide; octanoylperoxide; decanoylperoxide; lauroylperoxide; 3,5,5-trimethylhexanoylperoxide; benzoylperoxide; m-tolylperoxide; di-isopropylperoxydicarbonate; di-2-ethylhexylperoxydicarbonate; di-n-propylperoxydicarbonate; di-2-ethoxyethylperoxycarbonate; di-ethoxyisopropylperoxydicarbonate; di(3-methl-3-methoxybutyl)peroxycarbonate; acetylcyclohexylsulfonylperoxide; tert-butylperoxyacetate; tert-butylperoxyisobutylate; tert-butylperoxy-2-ethylhexalate; tert-butylperoxylaurate; tert-butyloxybenzoate; tert-butylperoxyisopropylcarbonate; di-tert-butylperoxyisophthalate; tert-butylperoxyallylcarbonate; isoamylperoxy-2-ethylhexanoate; di-tert-butylperoxyhexahydroterephthalate; tert-butylperoxyazelate; etc.

When the binder resin is selected from styrene-acrylic resins, the binder resin preferably includes elements soluble with tetrahydrofuran (THF), having at least one peak in a range of 3,000 to 50,000 (number-average molecular weight) and at one peak in a range not less than 100,000 in a molecular weight distribution by GPC thereof in terms of the fixability, offset resistance and storage stability of the resultant toner. In addition, the THF-soluble elements having a-molecular weight not greater than 100,000 is preferably from 50 to 90% by weight based on total weight of the THF-soluble elements. Further, the THF-soluble elements preferably have a main peak in a molecular weight range of from 5,000 to 30,000, and more preferably from 5,000 to 20,000.

When the binder resin is selected from vinyl polymers such as styrene-acrylic resins, the binder resin preferably has an acid value of from 0.1 to 100 mg KOH/g, more preferably from 0.1 to 70 mg KOH/g, and much more preferably from 0.1 to 50 mg KOH/g.

Specific examples of monomers forming polyester polymers include the following materials.

Specific examples of bivalent alcohol include diols such as ethyleneglycol, propyleneglycol, 1,3-butanediol, 1,4-butanediol, 2,3-butanediol, 1,4-butenediol, diethyleneglycol, triethyleneglycol, 1,5-pentanediol, 1,6-hexanediol, neopentylglycol, 2-ethyl-1,3-hexanediol, and diols formed by polymerizing hydrogenated bisphenol A or bisphenol A with cyclic ethers such as an ethylene oxide and a propylene oxide. In order to crosslink polyester resins, alcohol having 3 valences or more is preferably used together.

Specific examples of polyalcohol having 3 or more valences include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxybenzene, etc.

Specific examples of acids forming the polyester polymers include benzene dicarboxylic acids or their anhydrides such as a phthalic acid, an isophthalic acid and a terephthalic acid; alkyl dicarboxylic acids or their anhydrides such as a succinic acid, an adipic acid, a sebacic acid and an azelaic acid; unsaturated diacids such as a maleic acid, a citraconic acid, an itaconic acid, an alkenylsuccinic acid, a fumaric acid and a mesaconic acid; and unsaturated diacid anhydrides such as a maleic acid anhydride, a citraconic acid anhydride, an itaconic acid anhydride and an alkenylsuccinic acid anhydride; etc. Specific examples of polycarboxylic acids having 3 or more valences include a trimellitic acid, a pyromellitic acid, a 1,2,4-benzenetricarboxylic acid, a 1,2,5-benzenetricarboxylic acid, a 2,5,7-naphthalenetricarboxylic acid, a 1,2,4-naphthalenetricarboxylic acid, a 1,2,4-butanetricarboxylic acid, a 1,2,5-hexanetricarboxylic acid, a 1,3-dicarboxyl-2-methyl-methylenecarboxypropane, tetra(methylenecarboxyl)methane, 1,2,7,8-octantetracarboxylic acids, empol trimer or their anhydrides, or those partially replaced with lower alkyl esters, etc.

When the binder resin is a polyester resin, the binder resin preferably includes elements soluble with tetrahydrofuran (THF), having at least one peak in a range of 3,000 to 50,000 (number-average molecular weight) in a molecular weight distribution by GPC thereof in terms of the fixability and offset resistance of the resultant toner. In addition, the THF-soluble elements having a molecular weight not greater than 100,000 is preferably from 60 to 100% by weight based on total weight of the THF-soluble elements. Further, the THF-soluble elements preferably have a main peak in a molecular weight range of from 5,000 to 20,000.

When the binder resin is a polyester resin, the binder resin preferably has an acid value of from 0.1 to 100 mgKOH/g, more preferably from 0.1 to 70 mgKOH/g, and most preferably from 0.1 to 50 mgKOH/g.

In the present invention, the molecular weight distribution of the binder resin is measured by gel permeation chromatography (GPC) using THF as a solvent.

In the vinyl polymers and/or polyester resins, resins including monomers reactable therewith can be used. Specific examples of the monomers forming the polyester resin, reactable with the vinyl polymer include unsaturated dicarboxylic acids or their anhydrides such as a phthalic acid, a maleic acid, a citraconic acid and an itaconic acid. Specific examples of the monomers forming the vinyl polymer include monomers having a carboxyl group or a hydroxy group, and an acrylic acid or ester methacrylates.

When the polyester polymer, vinyl polymer and other binder resins are used together, the united resins preferably includes resins having an acid value of from 0.1 to 50 mgKOH/g in an amount of 60% by weight.

In the present invention, the acid value of the binder resin can be measured according to JIS K-0070 as follows.

(1) Additives besides the binder resin (polymer) are removed from a sample or an acid value and a content of the additives besides the binder resin are measured before measured. 0.5 to 2.0 g of the sample is precisely weighed and the weight of the polymer is W g. For example, when the acid value of a binder resin in a toner is measured, the acid value and content of a colorant or a magnetic material are measured beforehand, and the acid value of the binder resin is calculated.

(2) The samples is dissolved with 150 ml of a mixture of toluene/ethanol (volume ratio 4/1) to prepare a solution in a beaker having a capacity of 300 ml.

(3) The solution is titrated with a potentiometric titrator using an ethanol solution 0.1 mol/l KOH.

(4) The usage of the ethanol solution is S (ml), and at the same time, the usage thereof without the sample is B (ml) and the acid value is determined by the following formula:

$$\text{acid value(mg KOH/g)} = [(S-B) \times f \times 5.61]/W$$

wherein f is a factor of KOH.

The binder resin and constituents including the binder resin of the toner preferably has a glass transition temperature of from 35 to 80° C., and more preferably from 40 to 75° C. in terms of the storage stability of the resultant toner. When lower than 35° C., the resultant toner tends to deteriorate in an environment of high temperature, and have offset problems when fixed. When higher than 80° C., the fixability thereof tends to deteriorate.

Specific examples of magnetic materials for use in the present invention include (1) magnetic iron oxides such as magnetite, maghematite and ferrite and iron oxides including other metal oxides; (2) metals such as iron, cobalt and nickel or their metal alloys with metals such as aluminum, cobalt, copper, lead, magnesium, tin, zinc, antimony, beryllium, bismuth, cadmium, calcium, manganese, selenium, titanium, tungsten and vanadium; and (3) their mixtures.

Specific examples thereof include $Fe_3O_4$, $\gamma\text{-}Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, an iron powder, a cobalt powder, a nickel powder, etc. These can be used alone or in combination. Particularly, fine powders of $Fe_3O_4$ and $\gamma\text{-}Fe_2O_3$ are preferably used.

In addition, magnetic iron oxides such as magnetite, maghematite and ferrite including a heterogeneous element or their mixtures can also be used. Specific examples of the heterogeneous element include lithium, beryllium, boron, magnesium, aluminum, silicon, phosphorus, germanium, zirconium, tin, sulfur, calcium, scandium, titanium vanadium, chrome, manganese, cobalt, nickel, copper, zinc, gallium, etc. Particularly, magnesium, aluminum, silicon, phosphorus or zirconium is preferably used. The heterogeneous element may be taken in a crystal lattice of the iron oxide or therein as an oxide. Alternatively, the heterogeneous element may be present on the surface thereof as an oxide or a hydroxide. The heterogeneous element is preferably included therein as an oxide.

The heterogeneous element can be taken in a magnetic material by mixing a salt thereof when preparing the magnetic material and performing a pH control. In addition, the heterogeneous element can be separated out on the surface of a magnetic material by performing the pH control or adding the salt thereof and performing the pH control after preparing the magnetic material. The toner preferably includes the magnetic material in an amount of from 10 to 200 parts by weight, and more preferably from 20 to 150 parts by weight per 100 parts by weight of the binder resin. The magnetic material preferably has a number-average particle diameter of from 0.1 to 2 μm, and more preferably from 0.1 to 0.5 μm. The number-average particle diameter can be determined by measuring a photograph thereof, zoomed by a transmission electron microscope, with a digitizer, etc.

The magnetic material preferably has a coercivity of from 2 to 150 Oe, a saturated magnetization of from 50 to 200 emu/g and a residual magnetization of from 2 to 20 emu/g when applied with 10 k Oe.

The magnetic material can be used as a colorant.

Specific examples of the colorants for use in the present invention include any known dyes and pigments such as carbon black, Nigrosine dyes, black iron oxide, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSA YELLOW (GR, A, RN and R), Pigment Yellow L, BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, redironoxide, redlead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red F5R, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone and their mixtures.

The toner preferably includes the colorant in an amount of from 1 to 15% by weight, and more preferably from 3 to 10% by weight.

The colorant for use in the present invention can be used as a masterbatch when combined with a resin. Specific examples of the resin used in the masterbatch or used with the masterbatch include the modified and unmodified polyester resins mentioned above; styrene polymers and substituted styrene polymers such as polystyrene, poly-p-chlorostyrene and polyvinyltoluene; styrene copolymers such as styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butylmethacrylate copolymers, styrene-methyl α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic acid ester copolymers; and other resins such as polymethyl methacrylate, polybutylmethacrylate, polyvinyl chloride, polyvinyl acetate, polyethylene, polypropylene, polyesters, epoxy resins, epoxy polyol resins, polyurethane resins, polyamide resins, polyvinyl butyral resins, acrylic resins, rosin, modified rosins, terpene resins, aliphatic or alicyclic hydrocarbon resins, aromatic petroleum resins, chlorinated paraffin, paraffin waxes, etc. These resins are used alone or in combination.

The masterbatch can be prepared by mixing and kneading a resin and a colorant upon application of high shearing stress thereto. In this case, an organic solvent is preferably used to increase interactions between the colorant and the resin. In addition, flushing methods, wherein an aqueous paste including a colorant is mixed with a resin solution of an organic solvent to transfer the colorant to the resin solution and then the aqueous liquid and organic solvent are separated and removed, is preferably used because the resultant wet cake of the colorant can be used as it is. A three roll mill is preferably used for kneading the mixture upon application of high shearing stress.

The toner preferably includes the colorant in an amount of from 0.1 to 20 parts by weight per 100 parts by weight of the binder resin.

The masterbatch preferably includes a resin having an acid value not greater than 30 mg KOH/g and an amine value of from 1 to 100 and a colorant dispersed therein, and more preferably includes a resin having an acid value not greater than 20 mg KOH/g and an amine value of from 10 to 50 and a colorant dispersed therein. When the acid value is greater than 30 mg KOH/g, the chargeability of the resultant toner occasionally deteriorates due to high humidity and the colorant is insufficiently dispersed in the masterbatch occasionally. When the amine value is less than 1 and greater than 100, the colorant is insufficiently dispersed in the masterbatch occasionally. The acid value is measured by the method disclosed in JIS K0700 and the amine value in JIS K7237.

A dispersant preferably has high compatibility with a binder resin in terms of pigment dispersibility. Specific examples of marketed products thereof include AJISPER PB821 and AJISPER PB822 from Ajinomoto Fine-Techno Co., Inc.; Disperbyk-2001 from BYK-Chemie GmbH; and EFKA-4010 from EFKA ADDITIVES.

A toner preferably includes the dispersant in an amount of from 0.1 to 10% byweight based on total weight of the colorant. When less than 0.1% by weight, the pigment is insufficiently dispersed occasionally. When greater than 10% by weight, the chargeability of the resultant toner occasionally deteriorates due to high humidity.

The dispersant preferably has a weight-average molecular weight, i.e., a molecular weight at a maximum main peak in the gel permeation chromatography of a styrene-converted weight, of from 500 to 100,000, more preferably from 3,000 to 100,000, furthermore preferably from 5,000 to 50,000, and most preferably form 5,000 to 30,000 in terms of pigment dispersibility. When less than 500, the dispersant has high polarity, resulting in occasional dispersibility deterioration of the colorant. When greater than 100,000, the dispersant has high affinity with a solvent, resulting in occasional dispersibility deterioration of the colorant.

The toner of the present invention may be mixed with a carrier and used as a two-component developer. Conventional carriers such as ferrite and magnetite, and resin-coated carriers can be used.

The resin-coated carrier is formed of a carrier core material and a coating material, i.e., a resin coating the surface of the carrier core material.

Specific examples of the resin include styrene-acrylic resins such as a styrene-esteracrylate copolymer and a styrene-estermethacrylate copolymer; acrylic resins such as an ester-acrylate copolymer and an estermethacrylate copolymer; fluorine-containing resins such as polytetrafluoroethylene, monochlorotrifluoroethylene polymer and polyvinylidenefluoride; a silicone resin; a polyester resin; a polyamide resin; polyvinylbutyral; and an aminoacrylate resin. Besides, any resins such as an ionomer resin and a polyphenylenesulfide resin usable as a coating material for a carrier can be used. These can be used alone or in combination. In addition, a binder carrier core, wherein a magnetic powder is dispersed in a resin, can also be used.

Methods of coating a resin coating material on the surface of the carrier core include dissolving or suspending a resin in a solvent to prepare a coating solution and coating the coating solution thereon; and simply mixing a resin and the carrier core in the state of powders.

The resin-coated carrier preferably includes a resin coating material in an amount of from 0.01 to 5% by weight, and more preferably from 0.1 to 1% by weight.

Specific examples of use, wherein a magnetic material is coated with a coating mixture including two or more materials, include carriers formed of (1) 12 parts of a mixture of dimethylchlorosilane and dimethylsilicone oil (5/1) and 100 parts of a fine powder of titanium oxide; and (2) 20 parts of a mixture of dimethylchlorosilane and dimethylsilicone oil (5/1) and 100 parts of a fine powder of silica.

As the resin coating material, a styrene-methylmethacrylate copolymer, mixtures of fluorine-containing resins and styrene copolymers or a silicone resin is preferably used. Particularly, the silicone resin is more preferably used.

Specific examples of the mixtures of fluorine-containing resins and styrene copolymers include a mixture of polyvinylidene fluoride and a styrene-methylmethacrylate copolymer; and a mixture of a polytetrafluoroethylene and a styrene-methylmethacrylate copolymer; a mixture of vinylidene fluoride-tetrafluoroethylene copolymer (10/90 to 90/10), a styrene-acrylate2-ethylhexyl copolymer (10/90 to 90/10) and a styrene-acrylate2-ethylhexyl-methylmethacrylate copolymer (20 to 60/5 to 30/10/50).

Specific examples of the silicone resin include a nitrogen-containing silicone resin and a modified silicone resin formed from a reaction between a nitrogen-containing silane coupling agent and a silicone resin.

Magnetic materials for the carrier core include iron oxides such as ferrite, iron-excess ferrite, magnetite and γ-iron oxide; an metals such as iron, cobalt, nickel and their metal alloys.

Specific examples of elements included therein include iron, cobalt, nickel, aluminum, copper, lead, magnesium, tin, zinc, antimony, beryllium, bismuth, calcium, manganese, selenium, titanium, tungsten, vanadium, etc. Copper-zinc-iron ferrite mainly including copper, zinc and iron; and manganese-magnesium-iron ferrite mainly including manganese, magnesium and iron are preferably used.

The carrier preferably has a resistivity of from $10^6$ to $10^{10}$ Ω·cm by controlling the concavities and convexities on the surface thereof an amount of a resin coated thereon.

The carrier preferably has a particle diameter of from 4 to 200 μm, more preferably from 10 to 150 μm, and much more preferably from 20 to 100 μm.

Particularly, the resin-coated carrier preferably has a 50% particle diameter of from 20 to 70 μm.

The two-component developer preferably includes the toner of the present invention in an amount of from 1 to 200 parts by weight, and more preferably from 2 to 50 parts by weight per 100 parts by weight of the carrier.

The toner of the present invention may include a wax besides a binder resin and a colorant.

Any known waxes can be used, and specific examples thereof include aliphatic hydrocarbon waxes such as low-molecular-weight polyethylene, low-molecular-weight polypropylene, a polyolefin wax, a microcrystalline wax, a paraffin wax and a sasol wax; aliphatic hydrocarbon wax oxides such as polyethylene oxide wax or their block copolymers; plant waxes such as a candelilla wax, a carnauba wax, a Japan wax, and a jojoba wax; animal waxes such as a bees wax, a lanolin and a whale wax; mineral waxes such as an ozokerite, a ceresin and a petrolatum; waxes mainly including fatty ester such as a montanic acid ester wax and a mosquito star wax; and waxes having partially or wholly deacidified fatty ester.

Specific examples of the wax further include saturated straight-chain fatty acids such as a palmitic acid, a stearic acid, a montanic acid and a straight-chain alkyl carboxylic acid having a straight-chain alkyl group; unsaturated fatty acids such as an eleostearic acid; saturated alcohols such as stearyl alcohol, behenyl alcohol, ceryl alcohol, mesilyl alcohol and long-chain alkyl alcohol; polyalcohols such as sorbitol; fatty acid amides such as linoleic amide, olefinic amide and lauric amide; saturated fatty acid bismaides such as methylenebisamide caprate, lauric ethylenebisamide and stearic hexamethylenebisamide; unsaturated fatty acid amides such as oleic ethylenebisamide, oleic hexamethylenebisamide, adipic N,N'-dioleylamide and sebacic N,N'-dioleylamide; aromatic bismaides such as stearic m-xylenebisamide and isophthalic N,N-distearylamide; fatty acid metal salts such as calcium stearate, calciumlaurate, zinc stearate and magnesium stearate; an aliphatic hydrocarbon wax grafted with a vinyl monomer such as styrene and an acrylic acid; a partially esterified compound of fatty acids such as monoglyceride behenate and polyalcohol; and a methyl ester compound having a hydroxyl group, formed by adding a hydrogen atom to a vegetable oil.

Preferred waxes include polyolefin formed by radically polymerizing olefin under high pressure; polyolefin formed by refining a low-molecular-weight byproduct when polymerizing high-molecular-weight polyolefin; polyolefin formed by polymerizing olefin with a catalyst such as a Ziegler catalyst and a metallocene catalyst under low pressure; polyolefin formed by polymerizing olefin using a radiation, an electromagnetic ray or light; low-molecular-weight polyolefin formed by pyrolyzing high-molecular-weight polyolefin; a paraffin wax; a microcrystalline wax; a Fischer-Tropsh wax; synthetic hydrocarbon waxes synthesized by a synthol method, a hydronalium call method, etc.; synthetic waxes having a monomer having a carbon atom; hydrocarbon waxes having a functional group such as a hydroxyl group or a carboxyl group; mixtures of hydrocarbon waxes and hydrocarbon waxes having a functional group; and waxes graft-modified with a vinyl monomer such as styrene, ester maleate, acrylate, methacrylate and maleic acid anhydride.

In addition, these waxes having sharper molecular weight distributions after subjected to a press sweating process, a solvent process, a recrystallization process, a vacuum distillation process, a supercritical gas extraction process or a solution crystallization process are preferably used. Further, waxes, wherein low-molecular-weight fatty acids, low-molecular-weight solid alcohols, low-molecular-weight solid compounds and other impurities are removed from these waxes, are preferably used as well.

The wax preferably has a melting point of from 70 to 140° C., and more preferably from 70 to 120° C. to balance the fixability and offset resistance of the resultant toner. When lower than 70° C., blocking resistance thereof tends to deteriorate. When higher than 140° C., the offset resistance thereof is difficult to develop.

In addition, combinations of two or more waxes can develop plasticizability and releasability of a wax at the same time.

A wax having plasticizability has a low melting point, or a branched-chain or a polar group on its molecular structure.

A wax having releasability has a low melting point, or a straight-chain or nonpolar group without a functional group on its molecular structure. Specific examples of the combinations include a combination of two ore more waxes having differences of melting point of from 10 to 100° C.; and a combination of polyolefin and graft-modified polyolefin.

When two waxes having similar structures are used, combinations of a low-melting-point wax relatively having plasticizability and a high-melting-point wax relatively having releasability are preferably used. The melting points preferably have a difference from 10 to 100° C. to effectively develop their separate functions. At least one of the waxes preferably has a melting point of from 70 to 120° C., and more preferably from 70 to 100° C. to exert the functional separation effect.

Waxes having branched-chain structures, polar groups such as functional groups, or waxes modified with components different from their main components relatively exert their plasticizabilities. On the other hand, waxes having straight-chain structure, nonpolar groups without functional groups, or unmodified waxes relatively exert their releasabilities. Preferred combinations of the waxes include a combination of a polyethylene homopolymer or copolymer primarily consisting of ethylene and a polyolefin homopolymer or copolymer primarily consisting of olefin besides ethylene; a combination of polyolefin and graft-modified polyolefin; a combination of an alcohol wax, a fatty acid wax or an ester wax and a hydrocarbon wax; a combination of a Fischer-Tropsh wax or a polyolefin wax and a paraffin wax or a microcrystalline wax; a combination of a Fischer-Tropsh wax and a polyolefin wax; a combination of a paraffin wax and a microcrystalline wax; a carnauba wax, a candelilla wax, a rice wax or a montan wax and a hydrocarbon wax.

The wax preferably has an endothermic peak in a range of from 70 to 110° C., and further a maximum peak therein when measured by a DSC method to balance the storage stability and fixability of the resultant toner.

The toner of the present invention preferably includes the waxes in an amount of from 0.2 to 20 parts by weight, and more preferably from 0.5 to 10 parts by weight per 100 parts by weight of a binder resin.

The melting point of the wax is the maximum endothermic peak when measured by a DSC method.

The endothermic peak of the wax or toner is preferably measure by a high-precision inner-heat input-compensation differential scanning calorimeter. The measurement method is based on ASTM D3418-82. A DSC curve measured when the temperature is increased at 10° C./min after increasing and decreasing the temperature is used.

The toner of the present invention may include a fluidity improver. The fluidity improver is added to the surface thereof to improve the fluidity thereof.

Specific examples thereof include fluorine-containing resin powders such as carbon black, a vinylidene fluoride fine powder and a polytetrafluoroethylene fine powder; a silica fine powder such as a wet method silica and a dry method silica; a titanium oxide fine powder; an alumina fine powder; and a surface-treated silica, a surface-treated titanium oxide and a surface-treated alumina with a silane coupling agent, a titanium coupling agent or a silicone oil. Particularly, the silica fine powder, titanium oxide fine powder and alumina fine powder are preferably used. The surface-treated silica with a silane coupling agent or a silicone oil is more preferably used.

The fluidity improver preferably has an average primary particle diameter of from 0.001 to 2 μm, and more preferably from 0.002 to 0.2 μm.

Preferred silica fine powders include a fine powder prepared by vapor-phase oxidizing a silicon halogen compound, i.e. a dry method silica or a fumed silica.

Specific examples of the marketed silica fine powders include AEROSIL-130, -300, -380, -TT600, -MOX170, -MOX80 and -COK84 from NIPPON AEROSIL CO., LTD.; Ca-O-SiL-M-5, -MS-7, -MS-75, -HS-5 and -EH-5 from Cabot Corp.; Wacker HDK-N20, -V15, -N20E, -T30 and -T40 from WACKER-CHEMIEGMBH; D-CFineSilica from Dow Corning Corp.; and Fansol from Fransil.

The silica fine powder prepared by vapor-phase oxidizing a silicon halogen compound is preferably hydrophobized. The hydrophobized silica fine powder preferably has a hydrophobicity of from 30 to 80% when measured by a methanol titration method. The silica fine powder is chemically or physically hydrophobized with an organic silicon compound.

Specific examples thereof include hydroxypropyltrimethoxysilane, phenyltrimethoxysilane, n-hexadecyltrimethoxysilane, n-octadecyltrimethoxysilane, vinylmethoxysilane, vinyltriethoxysilane, vinyltriacetoxysilane, dimethylvinylchlorosilane, divinylchlorosilane, γ-methacryloxypropyltrimethoxysilane, hexamethyldisilane, trimethylsilane, trimethylchlorosilane, dimethyldichlorosilane, methyltrichlorosilane, allyldimethylchlorosilane, allylphenyldichlorosilane, benzyldimethylchlorosilane, bromomethyldimethylchlorosilane, α-chlorethyltrichlorosilane, β-chloroethyltrichlorosilane, chloromethyldimethylchlorosilane, triorganosilylmercaptan, trimethylsilylmercaptan, triorganosilylacrylate, vinyldimethylacetoxysilane, dimethyletoxysilane, trimethyletoxysilane, trimethylmetoxysilane, methyltrietoxysilane, isobutyltrimetoxysilane, dimethyldimethoxysilane, diphenyldiethoxysilane, hexamethyldisiloxane, 1,3-divinyltetramethyldisiloxane, 1,3-diphenyltetramethyldisiloxane, dimethylpolysiloxane having 2 to 12 siloxane units and 0 to 1 hydroxyl group bonded with Si at the end unit, etc. Further, silicone oils such as a dimethyl silicone oil can also be used. This can be used alone or in combination.

The fluidity improver preferably has a number-average particle diameter of from 5 to 100 nm, and more preferably from 5 to 50 nm.

The fluidity improver preferably has a specific surface area not less than 30 m$^2$/g, and more preferably from 60 to 400 m$^2$/g when measured by a BET nitrogen absorption method. When a surface-treated fine powder, the fluidity improver preferably has a specific surface area not less than 20 m$^2$/g, and more preferably from 40 to 300 m$^2$/g.

The fluidity improver is preferably included in a toner in an amount of from 0.03 to 8 parts by weight per 100 parts by weight of the toner.

As other additives, various metal soaps, fluorine-containing surfactants and dioctylphthalate may optionally be included in the toner of the present invention for the purpose of protecting a photoreceptor or a carrier; improving the cleanability thereof; controlling heat, electrical and physical properties thereof; controlling the resistivity thereof; controlling the softening point thereof; and improving the fixability thereof; etc. As an electroconductivity imparting agent, inorganic fine powders such as tin oxide, zinc oxide, carbon black, antimony oxide, titanium oxide, aluminum oxide and alumina may optionally be included therein. The inorganic fine powders may optionally be hydrophobized. Lubricants such as polytetrafluoroethylene, zinc stearate and polyvinylidenefluoride; abrasives such as cesium oxide, silicon carbonate and strontium titanate; caking inhibitors; and developability improvers such as white and black particulate materials having polarities reverse to that of a toner can also be used in a small amount.

The additives preferably treated with various agents such as silicone varnishes, various modified silicone varnishes, silicone oils, various modified silicone oils, silane coupling agents, silane coupling agents having functional groups and other organic silicon compounds for the purpose of controlling the charge amount of the resultant toner.

A developer can be prepared by the following method. The inorganic particulate materials such as a hydrophobic silica fine powder may be added to a developer to increase the storage stability, developability and transferability thereof. A typical powder mixer is used to mix external additives, and preferably includes a jacket and is capable of controlling inner temperature. The external additive may gradually be added in the mixer or on the way of mixing to change the history of stressing the external additive. As a matter of course, the number of rotations, rotation speed, mixing time and mixing temperature of the mixer may be changed. A large stress may be applied to the external additive at thebeginning, and comparatively a small stress is applied thereto then, or vice versa.

Specific examples of the mixers include V-type Mixer, Rocking Mixer, Loedge Mixer, Nauter Mixer and Henschel Mixer.

In order to control the shape of a toner, after toner constituents such as a binder resin and a colorant are melted and kneaded upon application of heat, cooled and pulverized, the shape of the toner is mechanically controlled by Hybridizer or Machanofusion. Alternatively, the toner constituents are dissolved and dispersed in a solvent capable of dissolving the binder resin, and the solvent is removed from the dispersion by a spray drier to prepare a spherical toner. A spherical toner can also be prepared by being heated in an aqueous medium.

Inorganic particulate materials can externally be added to the toner of the present invention to supplement the chargeability thereof.

Specific examples of the inorganic particulate material include silica, alumina, titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, silicon nitride, etc.

The inorganic particulate material preferably has a primary particle diameter of from 2 to 5 µm, and more preferably from 5 to 500 µm.

The inorganic particulate material preferably has a specific surface area of from 20 to 500 $m^2/g$ when measured by a BET nitrogen absorption method.

The inorganic particulate material is preferably included in a toner in an amount of from 0.01 to 5% by weight, and more preferably from 0.01 to 2.0% by weight based on total weight of the toner.

Besides, polymer particulate materials, e.g., polystyrene, ester methacrylate and ester acrylate copolymers formed by soap-free emulsifying polymerization, suspension polymerization and dispersion polymerization; polycondensated particulate materials such as silicone, benzoguanamine and nylon; and polymerized particulate materials formed of thermosetting resins can also be used.

The external additives can be treated with a surface treatment agent to increase the hydrophobicity to prevent deterioration of fluidity and chargeability even in an environment of high humidity.

Specific examples of the surface treatment agent include a silane coupling agent, a sililating agents a silane coupling agent having an alkyl fluoride group, an organic titanate coupling agent, an aluminum coupling agent a silicone oil and a modified silicone oil.

The toner of the present invention may include a cleanability improver for removing a developer remaining on a photoreceptor and a first transfer medium after transferred. Specific examples of the cleanability improver include fatty acid metallic salts such as zinc stearate, calcium stearate and stearic acid; and polymer particulate materials prepared by a soap-free emulsifying polymerization method such as a polymethylmethacrylate particulate material and a polystyrene particulate material. The polymer particulate materials comparatively have a narrow particle diameter distribution and preferably have a volume-average particle diameter of from 0.01 to 1 µm.

Any known photoreceptors such as an organic photoreceptor; am amorphous silica photoreceptor, a selenium photoreceptor and a zinc oxide photoreceptor can be used in the present invention.

Next, the toner constituent liquid cooled and solidified in the granulator (granulation process) will be explained.

The toner constituent liquid heated and melted, and cooled and solidified preferably includes the following materials melted to prepare a solution having low viscosity as a main component.

Specific examples thereof include monoamide, bisamide, tetraamide, esteramide, polyester, polyvinylacetate, acrylic and methacrylic acid polymers, styrene polymers, ethylenevinylacetate copolymers, polyketone, silicone, coumarone, fatty acid esters, triglyceride, natural resins, natural and synthetic waxes, etc. These can be used alone or in combination.

Specific examples of the polyamide resin include Versamide 711, Versamide 725, Versamide 930, Versamide 940, Versalon 1117, Versalon 1138 and Versalon 1300 from Henkel Corp.; Tohmide 391, Tohmide 393, Tohmide 394, Tohmide 395, Tohmide 397, Tohmide 509, Tohmide 535, Tohmide 558, Tohmide 560, Tohmide 1310, Tohmide 1396, Tohmide 90 and Tohmide 92 from Fuji Kasei Kogyo Co., ltd.; polyester include KTR2150 from Kao Corp.; polyvinylacetate include AC401, AC540 and AC580 from Allied Chemical International Co., Ltd.; silicone include silicone SH6018 from Dow Corning Toray Co., Ltd., Silicone KR215, KR216 and KR220 from Shin-Etsu Chemical Co., Ltd.; and coumarone include Escron G-90 from Nippon Steel Chemical Co., Ltd.

Specific examples of the fatty acid include a stearic acid, an arachidic acid, a behenic acid, a lignoceric acid, a cerotic acid, a montanic acid, melissic acid and their esters. These can be used alone or in combination.

Specific examples of the fatty acid amide include lauric amide, stearic amide, oleic amide, erucic amide, ricinoleic amide, amide of stearic acid, palmitic amide, behenic amide and brassidic amide; and N-substituted fatty acid amide include N,N'-2-hydroxystearic amide, N,N'-ethylenebisoleic amide, N,N'-xylenebisstearic amide, monomethylolstearic amide, N-oleylstearic amide, N-stearylstearic-amide, N-oleylpalmitic amide, N-stearylerucic amide, N,N'-dioleyladipic amide, N,N'-dioleylsebacic amide, N,N'-distearylisophthalic amide and 2-stearamideethylstearate. These can be used alone or in combination.

Specific examples of the fatty acid esters preferably include monovalent or polyvalent alcohol fatty acid esters such as sorbitanmonopalmitate, sorbitanmonostearate, sorbitanmonobehenate, polyethyleneglycolmonostearate, polyethyleneglycoldistearate, propyleneglycolmonostearate, ethyleneglycoldistearate, etc.

Specific examples of marketed products thereof include Leodol SP-S10, Leodol SP-S30, Leodol SA10, Emasol P-10, Emasol S-10, Emasol S-20, Emasol B, Leodol Super SP-S10, Emanorn 3199, Emanorn 3299 and Exepearl PE-MS from Kao Corp., etc.

Specific examples of the fatty acid esters preferably include those of glycerin such as monoglyceridestearate, palmitinmonoglyceride, monoglycerideoleate, monoglyceridebehenate, etc. Specific examples of marketed products thereof include Leodol MS-50, Leodol MS-60, Leodol MS-165, Leodol MO-60 and Exepearl G-MB from Kao Corp.; Deodorized Carnauba Wax No. 1 and Refined Candelilla Wax No. 1 from Noda Wax Co., Ltd.; Synchrowax ERL-C and Synchrowax HR-C from Croda International Plc; and KF2 from Kawaken Fine Chemicals Co., Ltd. Specialty ester waxes such as Exepearl DS-C2 from Kao Corp.; Kawaslip-L and Kawaslip-R from Kawaken Fine Chemicals Co., Ltd. can also be used. Higher alcohol esters of higher fatty acids such as myricylcerociate, serylcerociate, serylmontanate, myricylpalmitate, myricylstearate, cetylpalmitate and cetylstearate can also be used.

Alkyl groups are present in both fatty acids and alcohols. These fatty acid esters can be used alone or in combination.

The fatty acid esters have low melting viscosities and stable fluidity when melting inks. In addition, having flexibilities higher and surface protections stronger than a carbon-carbon bond, a printed image can be folded. The fatty acid ester preferably has a penetration greater than 1 and high subjection to pressure treatment. Further, the fatty acid preferably has a viscosity less than 30 mPa·s when sprayed.

Typically, the polyamides are broadly classified into aromatic polyamides and dimer acid polyamides, and the dimer acid polyamides are preferably used in the present invention. The dimer acid is most preferably an oleic acid, a linoleic acid or an eleostearic acid. Specific examples of marketed products thereof include Marcomelt 6030, Marcomelt 6065, Marcomelt 6071, Marcomelt 6212, Marcomelt 6217, Marcomelt 6224, Marcomelt 6228, Marcomelt 238, Marcomelt 6239, Marcomelt 6240, Marcomelt 6301, Marcomelt 6900, DPX 335-10, DPX H-415, DPX 335-11, DPX 830, DPX 850, DPX 925, DPX 927, DPX 1160, DPX 1163, DPX 1175, DPX 1196 and DPX 1358 from Henkel Corp.; SYLVAMIDE-5 from Arizona Chemical Co.: and UNIREZ 2224 and UNIREZ 2970 from Union Camp Corp., etc.

Specific examples of the glycerides include rosin ester, lanolin ester, hardened ricinus, partially-hydrogenated ricinus, extremely-hardened soy oil, extremely-hardened canola oil, extremely-hardened vegetable oil, etc. These can be used alone or in combination.

Specific examples of the wax include petroleum-derived waxes such as paraffin wax and microcrystalline wax; plant waxes such as candelilla wax and carnauba wax; polyethylene wax; hardened ricinus; stearic acid; higher fatty acids such as a behenic acid; higher alcohol; ketones such as stearone and laurone; fatty acid ester amides; saturated or unsaturated fatty acid amides; and fatty acid esters. Particularly, the fatty acid ester amides, saturated or unsaturated fatty acid amides and fatty acid esters are preferably used.

These fatty acids, fatty acid amides, glycerides and waxes can be used alone or in combination.

These components can be mixed or dispersed by any known pulverizers or dispersers such as high-speed rotation mills, roller mills, container drive medium mills, medium agitation mills, jet mills, rotation cylinder mills, oscillation ball mills, centrifugal ball mills, colloid mills. Specific examples thereof include a cutter mill, a cage mill, a hammer mill, a centrifugal classification mill, a stamp mill, a fret mill, a centrifugal mill, a ball bearing mill, a ring roll mill, a table mill, a rolling ball mill, a tube mill, a conical mill, a tricone mill, a pot mill, a cascade mill, a centrifugal fluidization mill, an annular mill, a high-speed disperser, an inpera disperser, a gate mixer, a beads mill, a sand mill, a pearl mill, a cobra mill, a pin mill, a molinex mill, an agitation mill, a universal mill, a century mill, a pressure mill, an agitator mill, a two-roll extruder, a two-roll mill, a three-roll mill, a niche mill, a kneader, a mixer, a stone mill, a KD mill, a planetary mill, a high swing mill, a ring mill, an agitation tank agitation mill, an upright flow agitation mill, a ball mill, a paddle mixer, a tower mill, an attritor, a centrimill, a sand grinder, a glen mill, an attrition mill, a planetary mill, n oscillation mill, a flow jet mixer, a scrusher mill, a peg mill, a microfluidizer, a clea mix, a rhino mill, a homogenizer, a bead mill with pin, a horizontal beads mill, a pin mill, a majac mill, etc.

The toner materials are mixed, pulverized and dispersed by the above-mentioned pulverizers or dispersers to prepare a toner constituent liquid. The toner constituent liquid is led into the reservoir 14 while melted and discharged from the nozzle 11 of the dripper to form a droplet. Alternatively, the toner constituent liquid prepared by the above-mentioned pulverizers or dispersers is cooled, solidified and crushed, and crushed toner constituent is heated and melted at the reservoir 14 and discharged from the nozzle 11 of the dripper to form a droplet.

Next, a toner constituent liquid including a radiation hardening material, granulated, irradiated and hardened to form a particulate material will be explained.

Specific examples of the radiation-hardening material typically include radiation-sensitive resins or radiation-hardening resins such as cyclized polyisoprene, cyclized polybutadiene, poly(meth)acrylic ester of polyether, cinnamate ester of polyvinylalcohol, novolak resins, glycidylpolymethacrylate, polymethylstyrenechloride, etc.

The radiation-hardening materials are diluted with a solvent or a polymerizable monomer, and a radiation crosslinker or a radiation polymerization initiator is added thereto. Specific examples of the polymerizable monomer include vinyl aromatic monomers such as styrene, α-methylstyrene, vinyltoluene, chlorostyrene and divinylbenzene; acrylic monomers such as (meth)acrylate, methyl(meth)acrylate, n-butyl (meth)acrylate, hydroxyethyl(meth)acrylate, ethyleneglycoldi(meth)acrylate and (meth)acrylonitrile; vinylester monomers such as vinylformate and vinylacetate; halogenated vinyl monomers such as vinylchloride and vinylidenechloride; and diallylphthalate; triallylcyanurate, etc.

These can be used aloe or in combination. Styrene, (meth)acrylate ester or divinylbenzene is preferably included in an amount of from 0.05 to 3 parts by weight to prevent offset phenomena while the fixability of the resultant toner is maintained.

Specific examples of the radiation crosslinker or a radiation polymerization initiator include aromatic azide, azide compounds such as trichloromethylazide, halogenated silver, bisimidazole derivatives, cyanine pigments, ketocoumarine pigments, etc. In addition, azo radical polymerization initiators such as azobisisobutylonitrile and azobisvaleronitrile can also be used.

A droplet 31 of the toner constituent liquid including a radiation-hardening material is preferably irradiated by a high-pressure or a low-pressure mercury lamp to be hardened while flowing with ultraviolet having a wavelength up to 480 nm, and more preferably from 250 to 410 nm. An energy of from some $mJ/cm^2$ to some $J/cm^2$ is preferably needed to irradiate the droplet.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

(Preparation of Colorant Dispersion)

First, a carbon black dispersion was prepared.

17 parts of carbon black (Regal 1400 from Cabot Corp.), 3 parts of a pigment dispersant (AJISPER PB821 from Ajinomoto Fine-Techno Co., Inc.) and 80 parts of ethylacetate were primarily dispersed by a mixer having an agitation blade to prepare a primary dispersion. The primary dispersion was more dispersed with higher shearing strength by a dyno-mill to prepare a secondary dispersion completely free from aggregates having a size not less than 5 μm.

(Preparation of Wax Dispersion)

Next, a wax dispersion was prepared.

18 parts of carnauba wax, 2 parts of a wax dispersant (a polyethylene wax grafted with a styrene-butylacrylate copolymer) and 80 parts of ethylacetate were primarily dispersed by a mixer having an agitation blade to prepare a primary dispersion to prepare a primary dispersion. After the primary dispersion was heated to have a temperature of 80° C. while agitated to dissolve the carnauba wax, the dispersion was cooled to have a room temperature and wax particles having a maximum diameter not greater than 3 μm were precipitated. The primary dispersion was more dispersed with higher shearing strength by a dyno-mill such that the wax particles have a maximum diameter not greater than 2 μm.

(Preparation of Toner Constituent Dispersion)

Next, a toner constituent dispersion including a binder resin, the colorant dispersion and the wax dispersion was prepared.

100 parts of a polyester resin, each 30 parts of the colorant dispersion and thee wax dispersion, and 840 parts of ethylacetate were agitated for 10 min to be uniformly dispersed by a mixer having an agitation blade to prepare a dispersion. The pigment and wax did not aggregate with the solvent. The dispersion had a electroconductivity of $1.8 \times 10^{-7}$ S/m.

(Preparation of Toner)

The dispersion was fed into the droplet spray unit 2. The thin film 12 was formed of a nickel plate having an outer diameter of 8.0 mm and a thickness of 20 μm, on which perfect-circular nozzles 11 having a diameter of 10 μm were formed by electroforming. The nozzles were formed in the shape of a houndstooth check at the center of the plate in an area having a diameter of 5 mm such that there is a distance of 100 μm between each nozzle. The number of effective nozzles was 1,000.

After a droplet was discharged under the following conditions, the droplet was dried and solidified to prepare toner particles.

Specific gravity of the dispersion: 1.154 g/cm³
Dry air flow rate: dry nitrogen in the apparatus 30.0 L/min
Dry entrance temperature: 60° C.
Dry exit temperature: 45° C.
Dew point: −20° C.
Drive oscillation frequency: 180 kHz The toner particles were collected with a filter with pores having a diameter of 1 μm. The particle diameter distribution of the toner particles was measured by FPIA-2000 under the following conditions. The toner particles had a weight-average particle diameter (D4) of 5.1 μm, a number-average particle diameter (Dn) of 4.9 μm and D4/Dn of 1.04.

(Evaluation of Toner)

The following properties of the toner were evaluated. The results are shown in Table 1.

<Particle Diameter Distribution>

The particle diameter distribution of the toner can be measured by a flow type particle image analyzer FPIA-2100 from Toa Medical Electronics Co., Ltd.

A few drops a nonion surfactant (preferably Contaminon from Wako Pure Chemical Industries, Ltd.) are added to 10 ml of water which is filtered such that a microscopic dust is removed therefrom to include 20 or less of particles in a measurement range, e.g., having a circle-equivalent diameter of from 0.60 to less than 159.21 μm in a volume of $10^{-3}$ cm³ to prepare a mixture. Further, 5 mg of a sample are added thereto and the mixture is dispersed by an ultrasonic disperser UH-50 from STM Corp. at 20 kHz, 50 W/10 cm³ for 1 min to prepare a dispersion. The dispersion is further dispersed for totally 5 min to include the particles having a circle-equivalent diameter of from 0.60 to less than 159.21 μm in an amount of 4,000 to 8,000/$10^{-3}$ cm³ and the particle diameter distribution thereof was measured.

The sample dispersion is passed through a flow path (expanding along the flowing direction) of a flat and transparent flow cell (having a thickness of 200 μm). A strobe light and a CCD camera are located facing each other across the flow cell to form a light path passing across the thickness of the flow cell. While the sample dispersion flows, strobe light is irradiated to the particles at an interval of 1/30 sec to obtain images thereof flowing on the flow cell, and therefore a two-dimensional image of each particle having a specific scope parallel to the flow cell is photographed. From the two-dimensional image, the diameter of a circle having the same area is determined as a circle-equivalent diameter.

The circle-equivalent diameters of 1,200 or more of the particles can be measured and a ratio (% by number) of the particles have a specified circle-equivalent diameter can be measured.

<Charge Quantity>

A suction charge quantity measurer was used. Specifically, 200 to 250 mg of the toner were suctioned into a Faraday gauge having a filter collecting the toner, and an electrometer was connected thereto to measure total charge quantity of the suctioned toner. A chemical balance having five-figure preciseness measured an increased weight from a weight of the filter previously measured as a toner weight on the filter. The total charge quantity was divided by the toner weight to determined a charge quantity (q/m) per unit weight. As a marketed suction charge quantity measurer, a model 210HS-2A from TREK Japan KK is available. However, our own measurer having a similar constitutions was used. A glass microfiber having a diameter of 21 mm from Whatman Japan KK was used as the filter collecting the toner. The suction time was not longer than 30 sec although scarcely affecting the measurement.

<(NH) Charge Quantity at a Normal Temperature and a High Humidity>

In an environment laboratory having a temperature of 30° C. and a humidity of 90%, the charge quantity of a sample was measured by the above-mentioned method after left in the environment for 12 hrs.

<Charge Quantity Distribution>

The charge quantity distribution of the toner was measured by E-Spart analyzer EST-2 from Hosokawa Micron Limited. Specifically, a specific amount of the toner was directly led into a toner suction entrance of thereof by a feeder and the charge quantity distribution was measured. As indices of the charge quantity distribution, a most frequent (peak) value [q/d] and a distribution width a position having a half height of the most frequent (peak) value, i.e., a half width were used. The toner preferably has a sharp charge quantity distribution. Typically, the higher the charge quantity, the larger the half width tends to be.

<Thin Line Reproducibility>

The toner was set in modified copier imagio Neo 271 from Ricoh Company, Ltd., and images having an image area of 7% were produced on 6000 paper from Ricoh Company, Ltd. Thin line images on each of the 100,000$^{th}$ and 30,000$^{th}$ were observed with an optical microscope at a magnification of 100 times and compared with a grade sample to classify them into 4 grades (⊚>○>∆>X). X cannot be used as a product. An organic photoreceptor was used for a negatively-charged toner and an amorphous silicon photoreceptor for a positively-charged toner.

In Developing Method 1, the toner was directly transported to a developing site on an air stream and an electrostatic latent image was developed with a powder cloud of the toner. In Developing Method 2, a resin-coated carrier used in conventional electrophotography was used for transporting the toner. The carrier was formed by the following method:

dispersing a silicone resin in toluene to prepare a dispersion;

spraying the dispersion on core materials which are ferrite particles having an average particle diameter of 50 µm while heated to prepare coated ferrite particles; and burning and cooling the coated ferrite particles to prepare carrier particles having an average resin layer thickness of 0.2 µm.

Example 2

The preparation and evaluation of the toner in Example 1 were repeated except for using a droplet spray unit having an oscillation generator formed of a horn type oscillator in FIG. 7. The toner had a weight-average particle diameter (D4) of 5.0 µm and a number-average particle diameter (Dn) of 4.8 µm. The evaluation results are shown in Table 1.

Example 3

The preparation and evaluation of the toner in Example 1 were repeated except for using a droplet spray unit having an oscillation generator formed of a Langevin type oscillator in FIG. 8. The toner had a weight-average particle diameter (D4) of 5.2 µm and a number-average particle diameter (Dn) of 5.0 µm. The evaluation results are shown in Table 1.

Example 4

The preparation and evaluation of the toner in Example 1 were repeated except for replacing the piezoelectric body of droplet spray unit with a piezoelectric body having a resonance frequency of 540 kHz to change the drive oscillation frequency to 540 kHz. The toner had a weight-average particle diameter (D4) of 5.2 µm and a number-average particle diameter (Dn) of 4.8 µm. The evaluation results are shown in Table 1.

Example 5

The preparation and evaluation of the toner in Example 1 were repeated except for replacing the piezoelectric body of droplet spray unit with a piezoelectric body having a resonance frequency of 1.2 MHz to change the drive oscillation frequency to 1.2 MHz. The toner had a weight-average particle diameter (D4) of 5.5 µm and a number-average particle diameter (Dn) of 4.8 µm. The evaluation results are shown in Table 1.

Example 6

The preparation and evaluation of the toner in Example 1 were repeated except for changing the distance between each nozzle to 75 µm. The number of effective nozzles was 1,600. The toner had a weight-average particle diameter (D4) of 5.3 µm and a number-average particle diameter (Dn) of 4.9 µm. The evaluation results are shown in Table 1.

Example 7

The preparation and evaluation of the toner in Example 1 were repeated except for changing the distance between each nozzle to 50 µm. The number of effective nozzles was 2,200. The toner had a weight-average particle diameter (D4) of 5.8 µm and a number-average particle diameter (Dn) of 5.2 µm. The evaluation results are shown in Table 1.

Example 8

The preparation and evaluation of the toner in Example 1 were repeated except for changing the thickness of the thin film to 10 µm. The toner had a weight-average particle diameter (D4) of 5.2 µm and a number-average particle diameter (Dn) of 5.0 µm. The evaluation results are shown in Table 1.

Example 9

The preparation and evaluation of the toner in Example 1 were repeated except for changing the thickness of the thin film to 50 µm. The toner had a weight-average particle diameter (D4) of 5.2 µm and a number-average particle diameter (Dn) of 5.1 µm. The evaluation results are shown in Table 1.

Example 10

The preparation and evaluation of the toner in Example 1 were repeated except for changing the thickness of the thin film to 200 µm. The toner had a weight-average particle diameter (D4) of 5.3 µm and a number-average particle diameter (Dn) of 5.0 µm. The evaluation results are shown in Table 1.

Comparative Example 1

(Preparation of Toner Constituent Dispersion)

The preparation of the toner constituent dispersion in Example 1 was repeated.

(Preparation of Toner)

The apparatus used in Example 1 was replaced with an apparatus equipped with a reservoir retaining the dispersion and a head capable of applying a piezoelectric pulse to the reservoir by expansion and contraction of a piezoelectric body to discharge a droplet of the dispersion from a nozzle of the head. After the droplet was discharged under the following conditions, the droplet was dried and solidified to prepare toner particles.

Specific gravity of the dispersion: 1.154 g/cm³
Dry air flow rate: dry nitrogen in the apparatus 30.0 L/min
Dry entrance temperature: 60° C.
Dry exit temperature: 45° C.
Dew point: −20° C.
Drive oscillation frequency: 20 kHz While oscillation was applied to the nozzle in Example 1, the piezoelectric pulse was applied to the dispersion reservoir.

The toner particles were collected with a filter with pores having a diameter of 1 μm. The particle diameter distribution of the toner particles was measured by FPIA-2000. The toner particles had a weight-average particle diameter (D4) of 7.8 μm, a number-average particle diameter (Dn) of 5.2 μm, and a wide particle diameter distribution. The above-mentioned properties of the toner were evaluated. The results are shown in Table 1.

Comparative Example 2

(Preparation of Toner Constituent Dispersion)
The preparation of the toner constituent dispersion in Example 1 was repeated.
(Preparation of Toner)
The preparation and evaluation of the toner in Comparative Example 1 were repeated except for further converging the piezoelectric pulse into a pressure pulse with an acoustic lens.

The toner particles were collected with a filter with pores having a diameter of 1 μm. The particle diameter distribution of the toner particles was measured by FPIA-2000. The toner particles had a weight-average particle diameter (D4) of 7.2 μm, a number-average particle diameter (Dn) of 5.6 μm, and a wide particle diameter distribution. The evaluation results are shown in Table 1.

prepare a primary dispersion. The primary dispersion was more dispersed with higher shearing strength by a dyno-mill to prepare a secondary dispersion completely free from aggregates having a size not less than 5 μm.
(Preparation of Wax Dispersion)
Next, a wax dispersion was prepared.

18 parts of carnauba wax, 2 parts of a wax dispersant (a polyethylene wax grafted with a styrene-butylacrylate copolymer) and 80 parts of ethylacetate were primarily dispersed by a mixer having an agitation blade to prepare a primary dispersion to prepare a primary dispersion. After the primary dispersion was heated to have a temperature of 80° C. while agitated to dissolve the carnauba wax, the dispersion was cooled to have a room temperature and wax particles having a maximum diameter not greater than 3 μm were precipitated. The primary dispersion was more dispersed with higher shearing strength by a dyno-mill such that the wax particles have a maximum diameter not greater than 2 μm.
(Preparation of Toner Constituent Dispersion)
Next, a toner constituent dispersion including a binder resin, the colorant dispersion and the wax dispersion was prepared.

100 parts of a polyester resin, each 30 parts of the colorant dispersion and thee wax dispersion, and 840 parts of ethylacetate were agitated for 10 min to be uniformly dispersed by a mixer having an agitation blade to prepare a dispersion. The pigment and wax did not aggregate with the solvent.
(Preparation of Toner)
The dispersion was fed into the reservoir 114 of the droplet spray unit 102 in FIG. 17 or 19. The thin film 112 is formed by a nickel electroforming and perfectly circular nozzles 111 having a diameter of 10 μm are located in the shape of a hounds tooth check. The nozzles 111 face the oscillation surface 113*a*.

The oscillator 113 is a combination of the oscillation generator 121 formed of double-layered piezoelectric bodies

TABLE 1

|  | Charge Quantity (μC/g) | NH Charge Quantity (μC/g) | Charge Quantity Distribution Peak Value (fc/μm) | Charge Quantity Distribution Half Width (fc/μm) | Thin Line Reproducibility (Developing Method 1) | Thin Line Reproducibility (Developing Method 2) |
|---|---|---|---|---|---|---|
| Example 1 | −33.5 | −31.8 | −0.42 | 0.13 | ◎ | ◎ |
| Example 2 | −31.3 | −30.2 | −0.43 | 0.16 | ◎ | ◎ |
| Example 3 | −32.5 | −29.8 | −0.41 | 0.17 | ○ | ○ |
| Example 4 | −33.5 | −31.6 | −0.41 | 0.15 | ◎ | ◎ |
| Example 5 | −31.9 | −30.0 | −0.39 | 0.15 | ◎ | ◎ |
| Example 6 | −30.1 | −26.9 | −0.37 | 0.16 | ◎ | ◎ |
| Example 7 | −30.9 | −28.0 | −0.38 | 0.17 | ◎ | ○ |
| Example 8 | −33.0 | −28.5 | −0.35 | 0.16 | ◎ | ◎ |
| Example 9 | −32.5 | −30.2 | −0.40 | 0.17 | ◎ | ◎ |
| Example 10 | −33.7 | −32.3 | −0.43 | 0.16 | ○ | ○ |
| Comparative Example 1 | −25.4 | −24.3 | −0.18 | 0.25 | Δ | X |
| Comparative Example 2 | −27.4 | −26.4 | −0.24 | 0.32 | ○ | Δ |

As shown in Table 1, the present invention efficiently granulate a quality toner. In addition, the toner developed quality images faithful to electrostatic latent images.

Example 11

(Preparation of Colorant Dispersion)
First, a carbon black dispersion was prepared.

17 parts of carbon black (Regal 1400 from Cabot Corp.), 3 parts of a pigment dispersant (AJISPER PB821 from Ajinomoto Fine-Techno Co., Inc.) and 80 parts of ethylacetate were primarily dispersed by a mixer having an agitation blade to having a thickness of 7.0 mm and a diameter of 20 mm and the oscillation amplifier 122 having a rectangle oscillation surface 113*a* (50 mm×10 mm). The thin film had a maximum amplitude of 4.0 μm.

After a droplet was discharged under the following conditions, the droplet was dried and solidified to prepare toner particles.

Solid content of the dispersion: 7.0%
Specific gravity of the dispersion: 1.154 g/cm³
Dry air flow rate: dispersion nitrogen 2.0 L/min, dry nitrogen in the apparatus 30.0 L/min
Dry entrance temperature: 60° C.

Dry exit temperature: 45° C.
Dew point: −20° C.
Drive oscillation frequency: 40 kHz The toner particles were collected with a cyclone. The particle diameter distribution of the toner particles was measured by FPIA-2000. The toner particles had a weight-average particle diameter (D4) of 5.4 μm and a number-average particle diameter (Dn) of 5.0. The toner particles were produced at 230 g/hr.

(Evaluation of Toner)

The following properties of the toner were evaluated. The results are shown in Table 1.

<Particle Diameter Distribution>

The particle diameter distribution of the toner can be measured by a flow type particle image analyzer FPIA-2100 from Toa Medical Electronics Co., Ltd.

<Thin Line Reproducibility>

As mentioned above, the toner was set in modified copier imagio Neo 271 from Ricoh Company, Ltd., and images having an image area of 7% were produced on 6000 paper from Ricoh Company, Ltd. Thin line images on each of the 100,000$^{th}$ and 30,000$^{th}$ were observed with an optical microscope at a magnification of 100 times and compared with a grade sample to classify them into 4 grades (◉>○>Δ>X). X cannot be used as a product. An organic photoreceptor was used for a negatively-charged toner and an amorphous silicon photoreceptor for a positively-charged toner.

A resin-coated carrier used in conventional electrophotography was used for transporting the toner. The carrier was formed by the following method:

dispersing a silicone resin in toluene to prepare a dispersion;

spraying the dispersion on core materials which are ferrite particles having an average particle diameter of 50 μm while heated to prepare coated ferrite particles; and burning and cooling the coated ferrite particles to prepare carrier particles having an average resin layer thickness of 0.2 μm.

Example 12

The preparation and evaluation of the toner in Example 11 were repeated except for changing the length of the short side of the oscillation surface to 5 mm and the oscillation frequency to 100 kHz. The toner had a weight-average particle diameter (D4) of 5.2 μm and a number-average particle diameter (Dn) of 4.9 μm. The toner particles were produced at 200 g/hr. The evaluation results are shown in Table 2.

Example 13

The preparation and evaluation of the toner in Example 11 were repeated except for locating 10 of the droplet spray units on the ceiling of the granulator. The toner had a weight-average particle diameter (D4) of 5.3 μm and a number-average particle diameter (Dn) of 4.9 μm. The toner particles were produced at 2,100 g/hr. The evaluation results are shown in Table 2.

Example 14

The preparation and evaluation of the toner in Example 11 were repeated except for changing the oscillation generator of the oscillator 113 into a bolted Langevin type oscillator. The toner had a weight-average particle diameter (D4) of 5.4 μm and a number-average particle diameter (Dn) of 5.1 μm. The toner particles were produced at 235 g/hr. The evaluation results are shown in Table 2.

Example 15

The preparation and evaluation of the toner in Example 11 were repeated except for replacing the droplet spray unit with the droplet spray unit in FIGS. 23 and 24 having an oscillation amplifier 122 including a reservoir. 10 reservoirs were formed on the oscillation surface of the oscillation amplifier. The toner had a weight-average particle diameter (D4) of 5.3 μm and a number-average particle diameter (Dn) of 5.0 μm. The toner particles were produced at 200 g/hr. The evaluation results are shown in Table 2.

Comparative Example 3

The preparation and evaluation of the toner in Example 11 were repeated except for replacing the droplet spray unit with the droplet spray unit without an oscillation amplifier. The thin film had an amplitude of 0.8 μm.

The droplet fell so slowly that some of the droplets joined together before dried. Further, dispersed particles clogged almost half of the nozzles in 10 min, and further the nozzles stopped discharging in 30 min, during which only 2 g of the toner particles were produced. The toner had a weight-average particle diameter (D4) of 10.4 μm and a number-average particle diameter (Dn) of 5.3 μm.

TABLE 2

| | Weight-average particle diameter (μm) | Number-average Particle diameter (μm) | Production per 1 hr (g) | Thin line reproducibility |
|---|---|---|---|---|
| Example 11 | 5.4 | 5.0 | 230 | ◉ |
| Example 12 | 5.2 | 4.9 | 200 | ◉ |
| Example 13 | 5.3 | 4.9 | 2,100 | ○ |
| Example 14 | 5.4 | 5.1 | 235 | ○ |
| Example 15 | 5.3 | 5.0 | 200 | ◉ |
| Comparative Example 3 | 10.4 | 5.3 | 2.0 (30 min) | X |

As shown in Table 2, the present invention efficiently granulate a quality toner. In addition, the toner developed quality images faithful to electrostatic latent images.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications Nos. 2007-131139 and 2007-099791, filed on May 17, 2007 and Apr. 15, 2007, respectively, the entire contents of which are herein incorporated by reference.

What is claimed is:

1. A toner preparation apparatus, comprising:
  a dripper configured to periodically drip and discharge a droplet of a toner constituent liquid comprising a resin and a colorant; and
  a granulator configured to solidify and granulate the droplet,
  wherein the dripper comprises:
    a thin film comprising plural nozzles; and
    an oscillator, comprising:
      an oscillation generator configured to generate an oscillation; and
      an oscillation amplifier bonded to the oscillation generator, the oscillation amplifier comprising an oscillation surface configured to amplify the oscillation, the oscillation surface facing the thin film and being oriented parallel to a surface of the thin film, wherein the oscillation amplifier has the shape of a horn and
  wherein the toner constituent liquid is fed between the surface of the thin film and the oscillation surface.

2. The toner preparation apparatus of claim 1, wherein the oscillation amplifier further comprises a bonded surface bonded to the oscillation generator, and wherein the oscillation surface has an area larger than an area of the bonded surface.

3. The toner preparation apparatus of claim 2, wherein each of the oscillation surface and the bonded surface has the shape of a rectangle having a ratio of a long side to a short side thereof not less than 2.0.

4. The toner preparation apparatus of claim 1, wherein the oscillator is a bolted Langevin type oscillator.

5. The toner preparation apparatus of claim 1, wherein the oscillation generator generates an oscillation having a frequency not less than 20 kHz and less than 2.0 MHz.

6. The toner preparation apparatus of claim 1, wherein the oscillation surface oscillates the thin film upon application of pressure of from 10 kPa to 500 kPa to an area the plural nozzles are located in.

7. The toner preparation apparatus of claim 1, wherein the thin film has a ratio R ($\Delta Lmax/\Delta Lmin$) of a maximum ($\Delta Lmax$) oscillation direction displacement to a minimum ($\Delta Lmin$) oscillation direction displacement not greater than 2.0.

8. The toner preparation apparatus of claim 1, wherein the thin film is a metallic thin film having a thickness of from 5 to 500 μm and each of the plural nozzles has an opening of from 3 to 35 μm.

9. A method for the toner preparation apparatus of claim 1 to prepare a toner, comprising:

periodically dripping and discharging, with the dripper, a droplet of a toner constituent liquid comprising a resin and a colorant; and solidifying and granulating the droplet.

10. The method of claim 9, wherein the oscillation amplifier further comprises a bonded surface bonded to the oscillation generator, and wherein the oscillation surface has an area larger than an area of the bonded surface.

11. The method of claim 10, wherein each of the oscillation surface and the bonded surface has the shape of a rectangle having a ratio of a long side to a short side thereof not less than 2.0.

12. The method of claim 9, wherein the oscillator is a bolted Langevin type oscillator.

13. The method of claim 9, wherein the oscillation generator generates an oscillation having a frequency not less than 20 kHz and less than 2.0 MHz.

14. The method of claim 9, wherein the oscillation surface oscillates the thin film upon application of pressure of from 10 kPa to 500 kPa to an area the plural nozzles are located in.

15. The method of claim 9, wherein the thin film has a ratio R ($\Delta Lmax/\Delta Lmin$) of a maximum ($\Delta Lmax$) oscillation direction displacement to a minimum ($\Delta Lmin$) oscillation direction displacement not greater than 2.0.

16. The method of claim 9, wherein the thin film is a metallic thin film having a thickness of from 5 to 500 μm and each of the plural nozzles has an opening of from 3 to 35 μm.

* * * * *